United States Patent
Kato

(10) Patent No.: US 6,499,292 B2
(45) Date of Patent: Dec. 31, 2002

(54) METHOD FOR CONTROLLING EXHAUST EMISSIONS IN DIRECT INJECTED ENGINE

(75) Inventor: Masahiko Kato, Shizuoka (JP)

(73) Assignee: Sanshin Kogyo Kabushiki Kaisha, Hamamatsu ( * ) Notice: Subject to any disclaimer, the term of this patent is extended or adjusted under 35 U.S.C. 154(b) by 0 days.

(21) Appl. No.: 09/834,804

(22) Filed: Apr. 13, 2001

(65) Prior Publication Data

US 2001/0029734 A1 Oct. 18, 2001

(30) Foreign Application Priority Data

Apr. 13, 2000 (JP) ........................................ 2000-111552

(51) Int. Cl.$^7$ ................................................ F01N 3/00
(52) U.S. Cl. ............................. 60/284; 60/288; 60/285; 60/290
(58) Field of Search .......................... 60/274, 285, 286, 60/287, 288, 290, 302, 284, 297

(56) References Cited

U.S. PATENT DOCUMENTS

| | | | |
|---|---|---|---|
| 3,824,788 A | * 7/1974 | Cole et al. ...................... 60/284 |
| 4,192,140 A | 3/1980 | Yamashita et al. |
| 4,848,082 A | 7/1989 | Takahashi et al. |
| 5,190,006 A | 3/1993 | Motoyama et al. |
| 5,207,058 A | * 5/1993 | Sasaki et al. .................. 60/284 |
| 5,322,044 A | 6/1994 | Maebashi |
| 5,337,722 A | 8/1994 | Kurihara et al. |
| 5,400,755 A | 3/1995 | Maebashi |
| 5,490,382 A | * 2/1996 | Kato ............................ 60/302 |
| 5,522,360 A | 6/1996 | Suzuki et al. |
| 5,529,048 A | 6/1996 | Kurihara et al. |
| 5,553,590 A | 9/1996 | Suzuki et al. |
| 5,575,266 A | 11/1996 | Iida |
| 5,613,359 A | * 3/1997 | Zahn et al. .................... 60/288 |
| 5,655,498 A | 8/1997 | Suzuki et al. |
| 5,775,289 A | 7/1998 | Yoshida et al. |
| 5,782,214 A | 7/1998 | Nanami et al. |
| 5,797,775 A | 8/1998 | Ozawa et al. |
| 5,806,473 A | 9/1998 | Kometani et al. |
| 5,826,425 A | * 10/1998 | Rossi Sebastiano et al. .. 60/284 |
| 5,839,275 A | * 11/1998 | Hirota et al. .................. 60/285 |
| 5,865,153 A | 2/1999 | Matsumoto |
| 5,885,120 A | 3/1999 | Yamazaki et al. |
| 5,885,122 A | 3/1999 | Fujimoto |
| 5,946,906 A | * 9/1999 | Akazaki et al. ................ 60/284 |
| 5,956,942 A | * 9/1999 | Sebastiano et al. ........... 60/284 |
| 5,967,862 A | 10/1999 | Motose |
| 6,007,392 A | 12/1999 | Motose |

(List continued on next page.)

FOREIGN PATENT DOCUMENTS

| JP | 4-231645 | * 8/1992 |
| JP | 2000-111552 | 4/2000 |

OTHER PUBLICATIONS

Application entitled, "Exhaust Catalyst for Outboard Motor Engine," Application No. 09/834,827 filed on Apr. 13, 2001, 36 pages along with 23 sheets of formal drawings.

Co–pending patent application: Ser. No.:09/526,283, filed Mar. 12, 2000, entiteld Fuel Injection Strategy for Four Cycle Engines, in the name of Tanaka Daijirou and Uichitake Uchiyama, and assigned to Yamaha Hatsudoki Kabushiki Kaisha.

Co–pending patent application: Ser. No.:09/671,102, filed Sep. 27, 2000, entiteld Control System for Two–Cycle Engine, in the name of Keiichi Hiki, and assigned to Snshin Kogyo Kabushiki Kaisha.

*Primary Examiner*—Thomas Denion
*Assistant Examiner*—Tu M. Nguyen
(74) *Attorney, Agent, or Firm*—Knobbe, Martens, Olson & Bear, LLP

(57) ABSTRACT

An direct injected internal combustion engine includes a catalytic device for cleaning the exhaust gases of the engine. A control system of the engine is configured to adjust at least one of fuel injection timing, fuel injection duration and ignition timing so as to increase the temperature of the exhaust gases entering the catalytic device.

7 Claims, 19 Drawing Sheets

U.S. PATENT DOCUMENTS

| | | | |
|---|---|---|---|
| 6,012,284 A | * | 1/2000 | Tanaka et al. ................. 60/287 |
| 6,021,748 A | | 2/2000 | Motose |
| 6,039,012 A | | 3/2000 | Motoyama |
| 6,039,013 A | | 3/2000 | Motose |
| 6,041,591 A | * | 3/2000 | Kaneko et al. ................ 60/284 |
| 6,044,642 A | * | 4/2000 | Nishimura et al. ........... 60/284 |
| 6,053,785 A | | 4/2000 | Kato et al. |
| 6,116,211 A | | 9/2000 | Suzuki et al. |
| 6,116,228 A | | 9/2000 | Motose et al. |
| 6,119,453 A | | 9/2000 | Motoese et al. |
| 6,158,212 A | * | 12/2000 | Tanaka ........................ 60/277 |
| 6,266,957 B1 | * | 7/2001 | Nozawa et al. ................ 60/284 |
| 6,318,074 B1 | * | 11/2001 | Nishimura et al. ........... 60/284 |

* cited by examiner

METHOD FOR CONTROLLING EXHAUST EMISSIONS IN DIRECT INJECTED ENGINE

PRIORITY INFORMATION

This application is based on and claims priority to Japanese Patent Application No. 2000-111552, filed Apr. 13, 2000, the entire contents of which is hereby expressly incorporated by reference.

BACKGROUND OF THE INVENTION

1. Field of the Invention

The present invention is directed to internal combustion engines such as those used in outboard motors, and the engine control systems therefor.

2. Description of Related Art

An outboard motor generally includes a powerhead that consists of a powering internal combustion engine and a surrounding protective cowling. A drive shaft housing and a lower unit depends from the powerhead. The drive shaft housing and lower unit journals a drive shaft that is driven by the engine. A transmission, which drives a propulsion device in the lower unit, thereby propels an associated watercraft.

There are two general categories of fuel supply systems for internal combustion engines. One type of fuel system utilizes a carburetor, which delivers a generally constant air/fuel ratio during a given intake cycle. The other type of fuel system utilizes fuel injection, which delivers a finite amount of fuel to the engine generally once per combustion cycle. Typically, in a fuel injected engine, the fuel is either injected into the induction system or injected directly into the combustion chamber. The later method is generally referred to as direct fuel injection.

The current trend in the industry is to use direct fuel injection to improve the performance, emissions, and fuel economy of an outboard motor. One of the advantages of direct fuel injection is that the fuel/air ratio can be precisely controlled over a wide range of engine speeds and operating conditions. For example, direct fuel injection can be used to create a stratified charge in the combustion chamber (i.e., stratified direct fuel injection). To create a stratified charge, the fuel typically is directed towards the spark plug and fuel is injected just prior to ignition such that the fuel/air mixture is rich around the spark plug gap when the spark plug is fired. The engine can therefore be run at an overall leaner fuel/air ratio. This reduces the amount of unburned hydrocarbons in the exhaust and increases fuel economy, especially at low to medium engines speeds.

Direct fuel injection can also be used to create a pre-mixed charge in the combustion chamber (i.e., pre-mixed direct fuel injection). To create a pre-mixed charge in a two cycle engine, the fuel typically is injected into the combustion chamber before the closure of the exhaust port. This is allows sufficient time for the fuel to be diffused before ignition. In a similar manner, to create a pre-mixed charge in a four cycle engine, the fuel is typically injected into the combustion chamber before the intake valve is closed. Premixing tends to increase the output power of the engine particularly at high engine speeds.

Typically, in outboard motors, the exhaust gas emitted from the engine is discharged to the atmosphere through a propeller boss and into the body of water in which the watercraft is operating. This arrangement tends to aid in silencing the exhaust gases. However, the use of underwater discharge produces certain problems. For example, the back pressure (i.e., the pressure inside the exhaust passages) tends to fluctuate as the water level at the propeller boss fluctuates. Such back pressure fluctuations can cause the charging efficiency and air/fuel ratio to fluctuate thereby leading to poor fuel consumption and increased exhaust emissions.

Additionally, many outboard motors utilize engines with cylinders that are disposed horizontally. In such an engine, lubricant can accumulate within the engine and can be transmitted to the cylinders when the engine is started. This also can increase exhaust emissions.

As such, in the interest of obtaining even better emission control in outboard motors, catalysts have been added to the exhaust systems outboard motors. However, the performance of the catalyst is highly dependent upon the temperature of the exhaust gases. For example, the catalyst is typically not activated until the exhaust gas entering the catalyst reaches 170–300° C. To achieve this temperature in the exhaust gas, the engine typically needs to be operating at engine speeds greater than 2000–3500 RPM. However, outboard motors are often operated for long periods of times at very low engines speeds or idle. During such periods, the exhaust temperature is usually about 100° C. Such exhaust temperatures are inadequate for activating the catalyst. Moreover, such low exhaust temperatures and can deactivate a catalyst that has been previously activated.

SUMMARY OF THE INVENTION

One aspect of the present invention involves the realization that the temperature of the exhaust gas entering the catalyst can be increased by adjusting the fuel injection and/or ignition timing in the engine of the outboard motor. This is particularly useful when the outboard motor is operating at low load and/or low engine speeds.

In accordance with one aspect of the present the invention, a two-stroke internal combustion engine comprises a cylinder block defining a cylinder bore. A cylinder head is fixed at one end of the cylinder block enclosing one end of the cylinder bore. A crankcase member is fixed at the other end of the cylinder block and encloses the other end of the cylinder bore. The crankcase member defines a crankcase chamber. A piston is positioned in the cylinder bore. A crankshaft is rotably journaled in the crankcase and driven by the piston. The piston, the cylinder bore and the cylinder head together define a combustion chamber. At least one scavenge passage is formed in the cylinder block for transferring an air charge compressed in the crankcase to the combustion chamber. The scavenge passage comprises a scavenge port configured such that reciprocating motion of the piston opens and closes the scavenge port. An exhaust passage formed in the cylinder block is for discharging exhaust gases from the combustion chamber. The exhaust passage comprises an exhaust port configured such that the reciprocating motion of the piston opens and closes the exhaust port. A spark plug has one end exposed to the combustion chamber and is operatively connected to a control system. A fuel injector is disposed to inject fuel directly into the combustion chamber. The fuel injector includes an actuator that is operatively connected to the control system. An exhaust system is connected to the exhaust passage. The exhaust system includes a catalytic treatment device. The control system is configured, at least during low engine speeds, to finish injecting an amount of fuel into the combustion chamber before the exhaust port closes. The control system is also configured to increase a temperature of the exhaust gases when the temperature of the exhaust gases become insufficient to activate the catalytic treatment device.

In accordance with another aspect of the invention, a four-stroke internal combustion engine comprises a cylinder block that defines a cylinder bore. A cylinder head is fixed at one end of the cylinder block enclosing one end of the cylinder bore. A crankcase member is fixed at the other end of the cylinder block and encloses the other end of the cylinder bore. The crankcase member defining a crankcase chamber. A piston is positioned in the cylinder bore. A crankshaft is rotably journaled in the crankcase and is driven by the piston. The piston, the cylinder bore and the cylinder head together defining a combustion chamber. The engine including at least one intake port and intake passage for transferring an air charge to the combustion chamber and at least one exhaust port and exhaust passage for discharging exhaust gases from the combustion chamber. A spark plug has one end exposed to the combustion chamber and is operatively connected to a control system. A fuel injector is disposed to inject fuel directly into the combustion chamber. The fuel injector includes an actuator that is operatively connected to the control system. An exhaust system is connected to the exhaust passage. The exhaust system includes a catalytic treatment device. The control system is configured, at least during low engine speeds, to begin injecting fuel into the combustion chamber before the intake port closes. The control system also being configured to increase a temperature of the exhaust gases if the temperature of the exhaust gases is insufficient to activate the catalytic treatment device.

In accordance with yet another aspect of the present invention, a method for increasing an operating temperature of a catalytic treatment device in a two-stroke internal combustion engine, comprises injecting an amount of fuel into a combustion chamber of the engine before an exhaust port closes, at least during low engine speeds, and increasing the operating temperature by at least one of adjusting fuel injection through a fuel injector arranged to inject fuel directly into a combustion chamber and adjusting ignition timing.

In accordance with yet another aspect of the present invention, a method for increasing an operating temperature of a catalytic treatment device in a four-stroke internal combustion engine, comprises injecting an amount of fuel into a combustion chamber of the engine before an intake port closes, at least during low engine speeds, and increasing the operating temperature by at least one of adjusting fuel injection through a fuel injector arranged to inject fuel directly into a combustion chamber and adjusting ignition timing.

In accordance with still yet another aspect of the present invention, a two-stroke internal combustion engine comprises a cylinder block defining a cylinder bore. A cylinder head is fixed at one end of the cylinder block enclosing one end of the cylinder bore. A crankcase member is fixed at the other end of the cylinder block and encloses the other end of the cylinder bore. The crankcase member defines a crankcase chamber. A piston is positioned in the cylinder bore. A crankshaft is rotably journaled in the crankcase and driven by the piston. The piston, the cylinder bore and the cylinder head together define a combustion chamber. At least one scavenge passage is formed in the cylinder block for transferring an air charge compressed in the crankcase to the combustion chamber. The scavenge passage comprises a scavenge port configured such that reciprocating motion of the piston opens and closes the scavenge port. An exhaust passage formed in the cylinder block is for discharging exhaust gases from the combustion chamber. The exhaust passage comprises an exhaust port configured such that the reciprocating motion of the piston opens and closes the exhaust port. A spark plug has one end exposed to the combustion chamber and is operatively connected to a control system. A fuel injector is disposed to inject fuel directly into the combustion chamber. The fuel injector includes an actuator that is operatively connected to the control system. An exhaust system is connected to the exhaust passage. The exhaust system includes a catalytic treatment device. The engine further including means for increasing an operating temperature of the catalytic treatment device.

In accordance with another aspect of the engine, a four-stroke internal combustion engine comprises a cylinder block that defines a cylinder bore. A cylinder head is fixed at one end of the cylinder block enclosing one end of the cylinder bore. A crankcase member is fixed at the other end of the cylinder block and encloses the other end of the cylinder bore. The crankcase member defining a crankcase chamber. A piston is positioned in the cylinder bore. A crankshaft is rotably journaled in the crankcase and is driven by the piston. The piston, the cylinder bore and the cylinder head together defining a combustion chamber. The engine including at least one intake port and intake passage for transferring an air charge to the combustion chamber and at least one exhaust port and exhaust passage for discharging exhaust gases from the combustion chamber. A spark plug has one end exposed to the combustion chamber and is operatively connected to a control system. A fuel injector is disposed to inject fuel directly into the combustion chamber. The fuel injector includes an actuator that is operatively connected to the control system. An exhaust system is connected to the exhaust passage. The exhaust system includes a catalytic treatment device. The engine further including means for increasing an operating temperature of the catalytic treatment device.

In accordance with another aspect of the present invention, an internal combustion engine comprises a cylinder block defining a cylinder bore. A cylinder head is fixed at one end of the cylinder block and encloses one end of the cylinder bore. A crankcase member is fixed at the other end of the cylinder block and encloses the other end of the cylinder bore. The crankcase member defines a crankcase chamber. A piston is positioned in the cylinder bore. A crankshaft is rotably journaled in the crankcase and is driven by the piston. The piston, the cylinder bore and the cylinder head together define a combustion chamber. The engine also includes at least one intake port and intake passage for transferring an air charge to the combustion chamber and at least one exhaust port and exhaust passage for discharging exhaust gases from the combustion chamber. A spark plug has one end exposed to the combustion chamber and is operatively connected to a control system. A fuel injector is disposed to inject fuel directly into the combustion chamber. The fuel injector includes an actuator that is operatively connected to the control system. An exhaust system is connected to the exhaust passage. The exhaust system includes a catalytic treatment device, the control system is configured to form a substantially premixed air/fuel charge at ignition during low engine speeds and to form a substantially stratified fuel-air charge at ignition during higher engine speeds.

In a accordance with another aspect of the present invention, a method for increasing an operating temperature of a catalytic treatment device in an internal combustion engine comprises forming a substantially pre-mixed air/fuel charge at ignition during low engine speeds and forming a substantially stratified fuel-air charge at ignition during higher engine speeds.

These and other aspects of the present invention will become readily apparent to those skilled in the art from the following detailed description of the preferred embodiments having reference to the attached figures, the invention not being limited to any particular preferred embodiments disclosed.

BRIEF DESCRIPTION OF THE DRAWINGS

These and other features of the invention will now be described with reference to the drawings of the preferred embodiments, which are intended to illustrate and not to limit the invention, and in which.

DETAILED DESCRIPTION OF THE PREFERRED EMBODIMENTS OF THE INVENTION

Figure 1:
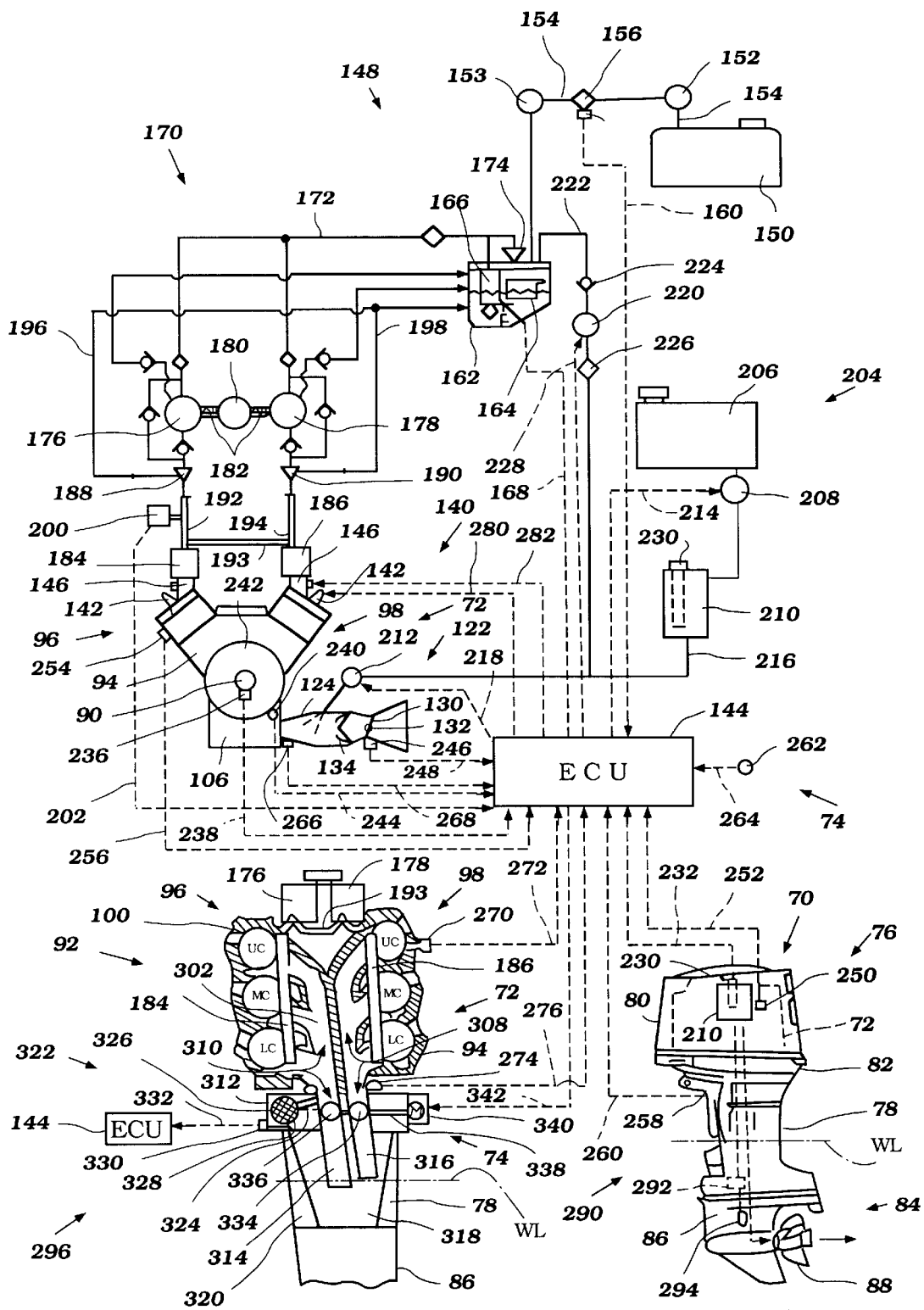
FIG. 1 is a three-part view with the two lower portions showing the outboard motor and the upper portion showing a top plan view of the engine of the outboard motor and its fuel supply system in a schematic view, the three views are linked together by an electronic control unit (ECU) that provides engine control, as well as for the operation of exhaust valves disposed in the exhaust system, as shown in the lower left-hand view.
Figure 2:
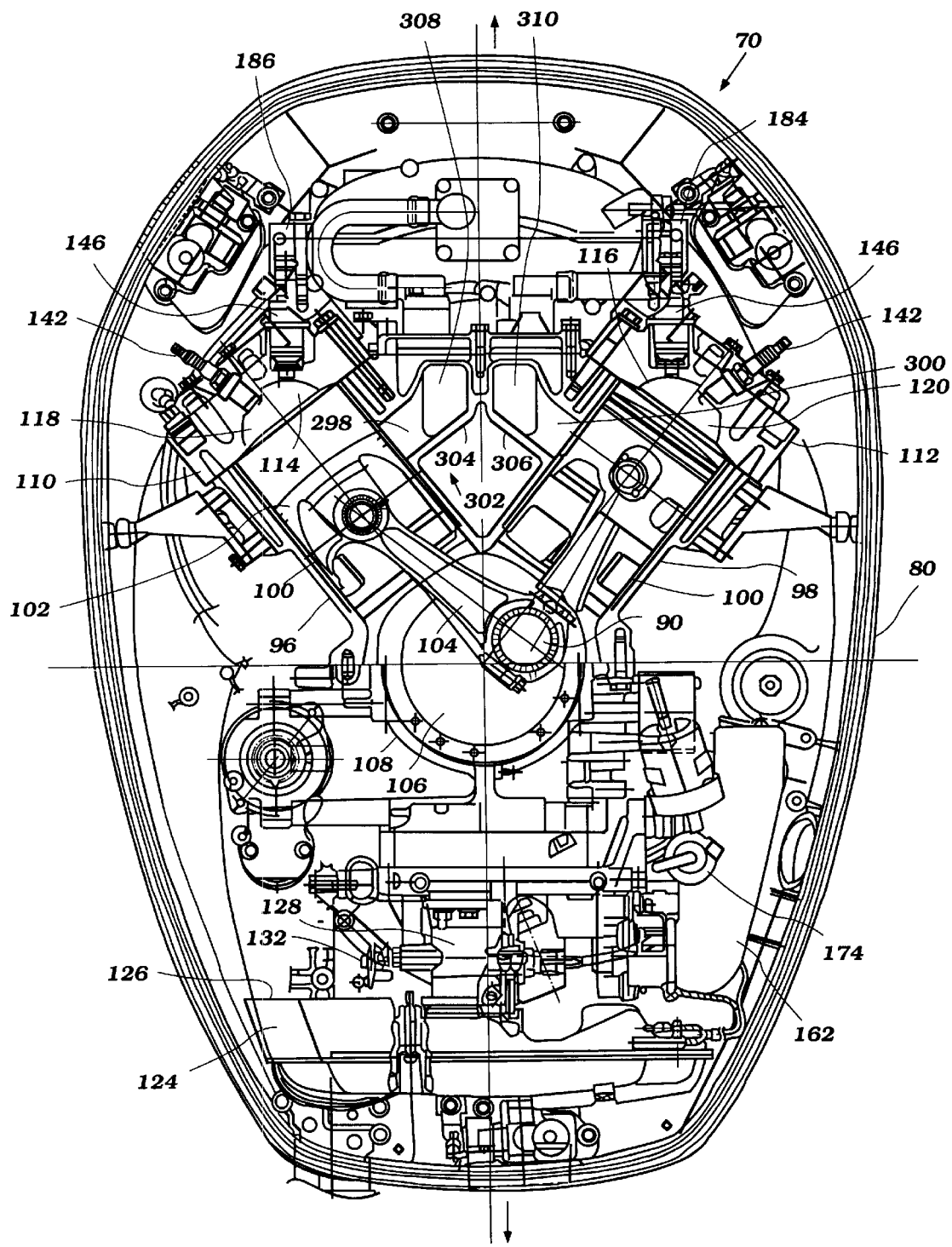
FIG. 2 is a top plan and partial sectional view of the outboard motor illustrated in FIG. 1.

With reference to FIGS. 1 and 2, an overall configuration of an outboard motor 70 is described below. The outboard motor 70 employs an internal combustion engine 72 having a engine control system 74 configured in accordance with a preferred embodiment of the present invention. The control system 74 has particular utility with outboard motors, and thus, is described in the context of the outboard motor 70. The control system 74, however, can be applied to other types of watercraft and recreational vehicles as well, such as, for example, personal watercraft, small jet boats, off-road vehicles, as well as automobiles.

In the lower right hand view of FIG. 1, the outboard motor 70 is depicted in side elevational view. The entire outboard motor 70 is not depicted in that the swivel bracket and clamping bracket are not completely illustrated. These components are well known in the art and the specific method by which the outboard motor 70 is mounted to the transom of an associated watercraft is not necessary to permit those skilled in the art to understand or practice the invention.

The outboard motor 70 includes a powerhead, indicated generally by the reference numeral 76, that is positioned above a driveshaft housing 78 and which houses the internal combustion engine 72. The engine 72 is shown in more detail in the remaining two views of the figure and is described in more detail below.

The powerhead 76 is surrounded by a protective cowling that includes a main cowling member 80. The main cowling member 80 is detachably affixed to a lower tray portion 82 of the protective cowling. The lower tray portion 82 encloses an upper portion of the drive shaft housing 78.

Positioned beneath the drive shaft housing 78, a lower unit 84, which includes a lower unit housing 86, rotatably journals a propeller 88. The propeller 88 forms the propulsion device for the associated watercraft.

As is typical with outboard motor practice, the engine 72 supported in the powerhead 76 so that its crankshaft 90 (see upper left hand side view of FIG. 1) rotates about a vertically extending axis. This facilitates connection of the crankshaft 90 to a drive shaft (not shown) which depends into the drive shaft housing 78. The drive shaft drives the propeller 88 through a conventional forward, neutral, or reverse transmission (not shown) contained in the lower unit 84.

The details of the construction of the outboard motor and the components which are not illustrated may be considered to be conventional or of any known type. Those skilled in the art can readily refer to any known constructions with which to practice the invention.

With continued reference to FIG. 1, the engine 72 of the illustrated embodiment is a V6 type engine and operates on a two stroke, crankcase compression principle. Although the invention is described in conjunction with an engine having a particular cylinder number and cylinder configuration, it is readily apparent that the invention can be utilized with engines having other numbers of cylinders, other cylinder configurations (e.g., in-line and W-type) and operating under other combustion principles (rotary, diesel, and 4-stroke principles).

The engine 72 includes an engine body 92. The engine body 92 includes a cylinder body or cylinder block 94 which forms a pair of cylinder banks 96, 98. Each cylinder bank 96, 98 is formed with three vertically spaced horizontally-extending cylinder bores 100 (cylinder sections are indicated as UC, MC, and LC, referring to upper cylinder, middle cylinder, and lower cylinder, respectively).

With reference to FIG. 2, pistons 102 reciprocate in the cylinder bores 100, which in the illustrated arrangement are lined with sleeves 101 (see FIG. 11) that are preferably press fitted into the cylinder bores 100. The pistons 102 are, in turn, connected to the upper or small ends of connecting rods 104. The big ends of the connecting rods 104 are journaled on throws of the crankshaft 90 in a manner that is well known in the art.

The crankshaft 90 is journaled in a suitable manner for rotation within a crankcase chamber 106 that is formed in part by a crankcase member 108 affixed to the cylinder block 94 in a suitable manner. As is typical with 2-cycle engines, the crankshaft 90 and the crankcase chamber 106 are formed with seals so that each section of the crankshaft 90 that is associated with one of the cylinder bores 100 will be sealed from the others. This type of construction is well known in the art.

Cylinder head assemblies, indicated generally by the reference numerals 110, 112, are affixed to the end of the cylinder banks 96, 98, respectively, opposite the crankcase chamber 106. The cylinder head assemblies 110, 112 each include a plurality of recesses 114, 116 on their inner faces. Each of these recesses 114, 116, cooperates with the cylinder bores 100 and the heads of the pistons 102 to define combustion chambers 118, 120. The cylinder head assemblies 110, 112 are preferably made of aluminum alloy diecast.

With reference to the upper portion of FIG. 1, an air induction system, indicated generally by the reference numeral 122, delivers an air charge to the sections of the crankcase chamber 106 associated with each of the cylinder bores 100. The communication is via an intake port (not shown) formed in the crankcase member 108 and registering with each of the crankcase chamber sections.

The induction system 122 includes an air silencing and inlet device, shown schematically in FIG. 1 and in partial top plan view in FIG. 2, and indicated generally by the reference numeral 124. With reference to FIG. 2, the inlet device 124 includes an inlet 126 and delivers induced air to at least one, and preferably a plurality, of throttle bodies 128. The throttle bodies 128 each include a throttle valve 130 (FIG. 1). The throttle valves 130 are supported on throttle valve shafts 132. The throttle valve shafts 132 are linked together for simultaneous opening and closing of the throttle valves 130 in a manner that is well known in the art.

The induction system 122 also includes reed-type check valves 134. These check valves 134 permit the induced air flow into the sections of the crankcase chamber 106 when the pistons 102 are moving upwardly in the respective cylinder bores 100. As the pistons 102 move downwardly, the charge is compressed in the sections of the crankcase chamber 106. At that time, the reed-type check valves 134 close to permit the charge to be compressed.

Figure 12:
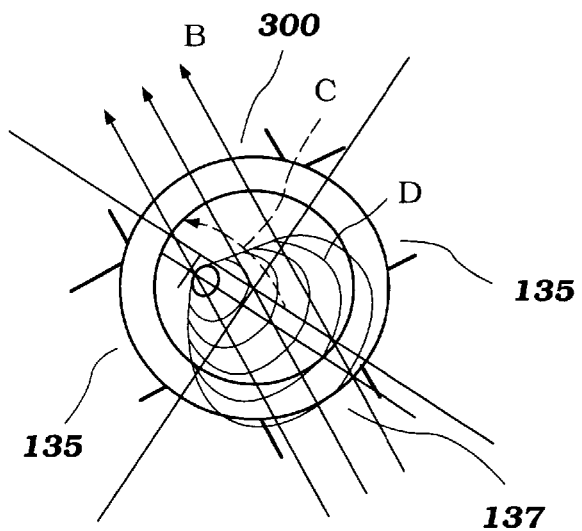
FIG. 12 is a schematic top plan view of the cylinder and cylinder head of FIG. 10 showing the details of the spray pattern.

The charge which is compressed in the section of the crankcase chamber 106 is then transferred to the combustion chambers 118, 120 through a scavenging system. With particular reference to FIG. 12, this scavenging system preferably is of the Schnurle-type and includes a pair of main scavenge passages (not shown) that are positioned on diametrically opposite sides of each of the combustion chambers 118, 120. These main scavenge passages terminate in main scavenge ports 135 so as to direct scavenge air flows into the combustion chambers 118, 120 of each cylinder bore 100. Additionally, auxiliary scavenge passages (not shown) are preferably formed between the main scavenge passages and terminate in auxiliary scavenging ports 137, which provide corresponding auxiliary scavenging air flows.

During the scavenging stroke of the engine 72, the intake charge is transferred to the combustion chambers for further compression. As the pistons 102 move upwardly from their bottom end or bottom-dead-center position, the scavenge ports are closed and the charge is further compressed.

With continued reference to FIG. 1, the outboard motor 70 also includes an ignition system, generally referred to by the reference numeral 140. The ignition system includes spark plugs 142 which are fixed to the cylinder head assemblies 110, 112 and extend into the combustion chambers 114, 116 (see also FIG. 11). In the illustrated embodiment, the spark plugs 142 are disposed so as to extend along an axis skewed relative to the axis of each cylinder bore 100. The spark plugs 142 are fired under the control of the electronic control unit (ECU) 144. The ECU 144 receives certain signals, as described below, for controlling the timing of firing of the spark plugs 142 in accordance with any desired control strategy.

Each spark plug 142, in turn, ignites a fuel air charge that is formed from fuel sprayed by a fuel injector 146 into the air entering the combustion chambers 114, 116, from the scavenge ports. In the illustrated embodiment, the fuel injectors 146 are solenoid type and are electrically operated under the control of the ECU 144. In the illustrated arrangement, the fuel injectors 146 are mounted directly in the cylinder head assemblies 110, 112 such that their nozzles 147 are exposed to the combustion chambers 118, 120. As will be explained in more detail below, the fuel injectors are arranged to provide optimum fuel vaporization under all running conditions.

Fuel is supplied to the fuel injectors 146 by a fuel supply system, indicated generally by the reference numeral 148. The fuel supply system includes a main fuel tank 150 that is preferably supported within a watercraft associated with the outboard motor 70. A first low-pressure pump 152 is connected to the main fuel tank by a fuel supply conduit 154. In some arrangements, a plurality of secondary low-pressure pumps (one secondary low-pressure pump 153 shown) can also be used to draw fuel from the fuel tank 150. The pumps can be manually operated pumps, diaphragm-type pumps operated by variations in pressure in the crankcase chamber 106, or any other suitable type of pump. Preferably, the pump 152 provides a relative low pressure draw.

A fuel filter 156 is positioned along the fuel supply conduit 154 at an appropriate location, preferably within the main cowling 80 so that the fuel filter 156 can be easily serviced. The fuel filter 156 is configured to remove undesirable amounts of water from the fuel. Therefore, the fuel filter 156 includes a sensor 158 which provides a signal to the ECU 144 through a fuel filter communication line 160 upon detection of such water or a pre-set amount of water having been removed from the fuel.

The fuel supply conduit 154 is connected to a vapor separator 162. The vapor separator 162 can be mounted on the engine 72 in any suitable location. With reference to FIG. 2, the vapor separator 162 is mounted to the engine 72 on the port side thereof.

With reference to FIG. 1, at the end of the fuel supply line 154, within the vapor separator 162, a valve is provided (not shown) that can be operated by a float 164 so as to maintain a desired level of fuel in the vapor separator 162.

A fuel pump 166 is provided within the vapor separator 162. The fuel pump 166 can be controlled by the ECU 144 via a fuel pump control line 168, in any suitable manner. The fuel pump 166 is connected to a high-pressure pumping assembly 170 with a fuel line 172. The fuel pump 166, in some arrangements, can be driven by an electric motor and preferably develops a pressure of about 3–10 kg/cm$^2$. A pressure regulator 174 can be connected between the fuel line 172 and the vapor separator 162 so as to provide a pressure-limiting return by returning some of the fuel pumped into the fuel line 172 by the pump 166 back to the vapor separator 162.

The illustrated high-pressure fuel pumping assembly 170 includes two high-pressure fuel pumps 176, 178 which are preferably configured to develop a pressure of about 50–100 kg/cm$^2$ or more. A pump drive unit 180 is provided for driving the high-pressure fuel pumps 176, 178. Preferably, the pump drive unit 180 is partly affixed to the cylinder block 94 so as to overhang between the cylinder banks 96, 98. A pulley (not shown) is affixed to a pump drive shaft of the pump drive unit 180. The pulley can be driven by means of a drivebelt (not shown) that is wrapped about a driving pulley affixed to the crankshaft 90. A tensioner preferably is provided for maintaining tension to such a drivebelt. The pump driveshaft preferably is provided with a cam disk (not shown) for operating at least one plunger 182 for each of the high-pressure fuel pumps 176, 178. Of course, any other suitable driving arrangement can also be used.

The high-pressure fuel pumps 176, 178 are connected to fuel rails 184, 186, respectively, which extend in a vertical direction, as illustrated in the lower portion of FIG. 1. The fuel rails 184, 186 are connected to the fuel injectors 146 connected to each of the cylinder head assemblies 110, 112.

Preferably, high-pressure adjusting valves 188, 190 are located between the high-pressure fuel pumps 176, 178 and the fuel rails 184, 186, respectively. High-pressure adjusting hoses connect the valves 188, 190 with the fuel rails 184, 186, respectively. The high-pressure adjustment valves are also connected to the vapor separator 162 via pressure relief lines 196, 198. Preferably, a heat exchanger (not shown) is provided along the relief lines 196, 198. At least one fuel pressure sensor 200 is connected to at least one of the high-pressure adjusting hoses 192, 194 so as to detect a pressure therein. The fuel pressure sensor 200 is connected to the ECU 144 with a fuel pressure communication line 202. As such, the high-pressure fuel pump arrangement assembly 170 maintains a substantially uniform fuel pressure therein, and the ECU 144 can monitor the fuel pressure therein through the fuel pressure sensor 200. Additionally, an arrangement of recirculating fuel lines and checkvalves is also preferably provided to allow fuel to be returned to the vapor separator 162. Preferably, a connection pip 193 connects the fuel lines 192, 194.

The outboard motor 10 also includes a lubrication system, referred to generally by the reference numeral 204. The lubrication system 204 includes a main lubricant tank 206 which is preferably supported within the watercraft associated with the outboard motor 70. The lubrication system 204 also includes a first lubricant pump 208, a second lubricant tank 210, and a lubricant injection pump 212. The lubricant pump 208 draws lubricant from the main lubricant tank 206 and delivers it to the second lubricant tank 210, which is preferably mounted within the cowling 80. The ECU 144 is connected to the pump 208 via a lubricant pump communication line 214. As such, the ECU can control the pump 208 so as to maintain a desired amount of lubricant within the lubricant tank 210. The lubricant tank 210 is connected to the lubricant pump 212 via a lubricant line 216.

The lubricant pump 212 is connected to the ECU 144 via a second lubricant pump communication line 218. The lubricant pump 212 includes an outlet disposed within the inlet device 124 so as to spray lubricant into the induced air traveling into the crankcase chamber 106. The ECU 144 controls the amount of oil sprayed into the inlet 124 by controlling the lubricant pump 212 via the communication line 218.

Preferably, the lubrication system 204 also includes a fuel pump 220 which draws fuel from the vapor separator 162 through a fuel line 222 and checkvalve 224. The fuel pump 220 delivers fuel to the lubricant supply line 216 through the fuel line 222 so as to premix some fuel with the lubricant sprayed into the inlet 124. Also preferably, a fuel filter 226 is provided in the fuel line 222 so as to remove foreign particles that may be entrained in the fuel flowing through the fuel line 222.

The ECU 144 communications with the fuel pump 220 via a fuel pump communication line 228. As such, the ECU 144 can control an amount of fuel drawn from the vapor separator by the fuel pump 220 to thereby control the relative proportions of fuel and oil injected into the inlet device 124. The lubrication system 204 also preferably includes a lubricant level sensor 230 (lower right-hand portion of FIG. 1) which is connected to the ECU 144 via a lubricant level sensor communication line 232. As such, the ECU 144 can receive a signal from the lubricant level sensor 230 and control the lubricant pump 208 in accordance with the signal from the sensor 230 so as to maintain a desired level of lubricant within the lubricant tank 210.

The operation of the fuel injectors 146 and the spark plugs 142 preferably is controlled via the control system 74. The control system 74 comprises the ECU 144 and a number of sensors configured to output a signal indicative of various conditions including, for example but without limitation, engine running conditions, ambient conditions, or conditions of the outboard motor 70 that affect engine performance. Specific details of the operation of the control system will be described in more detail below.

Certain sensors are schematically represented in FIG. 1. For example, an engine speed sensor 236 is mounted in the vicinity of the crankshaft 90 and/or flywheel attached to the crankshaft 90. The engine speed sensor 236 outputs a signal indicative of the speed of rotation of the crankshaft 90. The signal from the engine speed sensor 236 is transferred to the ECU 144 via a crankshaft speed data line 238.

Preferably, in addition to the engine speed sensor 236, the engine 72 includes a crankshaft position sensor 240 mounted in the vicinity of the flywheel 242 attached to the crankshaft 90. The output signal from the crankshaft position sensor 240 is transferred to the ECU 144 via a crankshaft position data line 244. As such, the ECU 144 can receive the output signal from the crankshaft position sensor for use in determining proper fuel injection and spark plug timing, for example.

A throttle position sensor 246 can be mounted in the vicinity of the throttle valve 130. The throttle valve position sensor 246 outputs a signal indicative of the throttle position of the throttle valve 130 so as to detect the position of the throttle valve 130. The signal from the throttle valve position sensor 246 is transferred to the ECU 144 via a throttle position data line 248. As such, the output of the throttle position sensor 246 can be used by the ECU 144 as an indication of operator demand or engine load.

For example, when an operator of the outboard motor desires to accelerate an associated watercraft, the operator advances a throttle actuator (not shown) and further opens the throttle valve 130, thus increasing the load on the engine.

A coolant temperature sensor 250 (see lower right-hand portion of FIG. 1) can be connected to a cooling jacket (not shown) provided on the engine 72 so as to detect the temperature of coolant flowing in the cooling jacket. The coolant temperature sensor 250 is connected to the ECU 144 via a coolant temperature data line 252. As such, the ECU can receive a signal from the cooling temperature sensor 250 indicative of the temperature of coolant flowing through the cooling jacket provided in the engine 72.

An engine temperature sensor 254 (see upper left-hand side of FIG. 1) can be connected to the engine body 92, and preferably, one of the cylinder banks 96, 98, so as to sense a temperature of the engine body 92. The engine temperature sensor 254 is connected to the ECU 144 via an engine temperature data line 256. As such, the ECU 144 can receive a signal from the engine temperature sensor 254 indicative of the temperature of the engine body 92.

A trim angle sensor 258 (see lower right-hand portion of FIG. 1) can be connected to the outboard motor 70 so as to sense a trim angle of the outboard motor 70. The trim angle sensor 258 is connected to the ECU 144 via a trim angle data line 260. As such, the ECU 144 can receive a signal from the trim angle sensor 258 that is indicative of a trim angle of the outboard motor 70.

The outboard motor 70 can also include a knock sensor, which may be in the form of a vibration sensor, connected to the engine body 92. The knock sensor 262 is configured to emit a signal indicative of whether combustion within the combustion chambers 118, 120 is producing knocks. The knock sensor 262 is connected to the ECU 144 by a knock sensor data line 264. As such, the ECU 144 can receive a signal from the knock sensor 262.

With reference to the upper left-hand portion of FIG. 1, the engine 72 can include an air pressure sensor 266. The air pressure sensor 266 is connected to the air intake device 124 so as to detect a pressure within the intake air device 124. The air pressure sensor 266 is connected to the ECU 144 with an air pressure sensor data line 268. As such, the ECU 144 can receive a signal from the air pressure sensor 266 which is indicative of an air pressure within the air intake device 124.

With reference to the lower left-hand portion of FIG. 1, the engine 72 can also include an air/fuel ratio sensor 270. Preferably, the air/fuel ratio sensor 270 is in the form of an oxygen sensor configured to detect an amount of oxygen present in the exhaust gases from one of the combustion chambers 118, 120, which is indicative of the air/fuel ratio of the air/fuel charge prior to combustion. The air/fuel ratio sensor 270 is connected to the ECU 144 via a air/fuel ratio data line 272. As such, the ECU 144 can receive a signal from the air/fuel ratio sensor 270.

The engine 72 can also include an exhaust back-pressure sensor 274. The backpressure sensor 274 is configured to sense a back-pressure within an exhaust passage of the engine body. The back-pressure sensor 274 is connected to the ECU 144 via a backpressure sensor data line 276. As such, the ECU 144 can receive a signal from the backpressure sensor 274 which is indicative of the back-pressure within the exhaust passage.

In addition to the sensors described above, additional sensors may be provided for detecting other conditions for use in accordance with various control strategies.

As noted above, the ECU 144, which is part of the engine control system 74, outputs signals to the fuel injectors 146, the spark plugs 142, and the fuel pump 166 for their respective control. The control strategy for the operation of these components will be described in more detail below. In the illustrated embodiment, the ECU 144 outputs a signal to the spark plugs via a spark plug control line 280. The ECU 144 also outputs a signal to the fuel injectors 146 via a fuel injector control line 282. The ECU 144 outputs a signal to the fuel pump 166 via the fuel pump control line 168. Additionally, the ECU 144 controls the lubricant injection pump 212, the lubricant pump 208, and the fuel pump 220 via the control lines 218, 214, and 228, respectively. Additionally, the ECU 144 can be connected to various other components of the engine 72 to control these components according to any known control strategy.

The outboard motor 70 also includes a cooling system, referred to generally by the reference numeral 290 (lower right-hand portion of FIG. 1). The cooling system includes a coolant pump 292 which can be driven by the driveshaft. The coolant pump 292 includes an inlet 294 disposed on the lower unit housing 86 so as to communicate with the body of water in which the outboard motor 70 is operating. The cooling system 290 also includes a plurality of cooling jackets throughout the outboard motor 70 for cooling components therein which are subjected to or generate heat. For example, the engine body 92 includes a number of cooling jackets around the cylinder walls, the combustion chambers, as well as various components of the exhaust system described in more detail below. The coolant pump 292 is configured to draw cooling water in through the inlet 294 and direct the cooling water through the various cooling jackets of the engine and the other components. As shown in the lower right-hand portion of FIG. 1, after the coolant flows upwardly into the engine 72, it then flows downwardly and is discharged through the propeller 88, along with exhaust gases. Certain components of the cooling system 290 are described in more detail below.

With reference to the lower left-hand portion of FIG. 1, the engine 72 includes an exhaust system, indicated generally by the reference numeral 296. With reference to FIG. 2, exhaust ports 298, 300 are formed on a side of the cylinder bores 100. In the illustrated embodiment, the exhaust ports 298, 300 are formed on the side of the cylinder banks 96, 98 which face toward the valley defined therebetween. An exhaust manifold 302 includes a plurality of exhaust runners 304, 306 having inlet ends which communicate with the exhaust ports 298, 300, respectively. The exhaust runners 304, 306 merge within a merging portion of the exhaust manifold 302 into main exhaust passages 308, 310. Although only one exhaust runner 304, 306 is illustrated for each cylinder bank 96, 98 in FIG. 2, there is at least one exhaust runner 304, 306 for each cylinder 100 defined in the engine body 92.

As is common in outboard motor practice, the exhaust manifold 302, including the portion where the exhaust runners 304, 306 merge together into the main exhaust passages 308, 310, it is monolithically cast with the cylinder banks 96, 98. However, it is conceived that the exhaust manifold 302 could also be formed separately and connected to the exhaust ports 298, 300 in any appropriate manner.

With reference to the lower left-hand portion of FIG. 1, the exhaust manifold 302 is shaped such that the merging portion of the exhaust manifold 302 extends downwardly and connects to an exhaust guideplate 312. The exhaust guideplate 312, described in more detail below, supports the engine 72 and includes apertures 362, 364 which define a portion of the main exhaust passages 308, 310, respectively. Additionally, exhaust pipes 314, 316 depend from the exhaust guideplate 312 and extend downwardly into an expansion chamber 318. The exhaust pipes 314 and 316 each include outlet ends terminating in the expansion chamber 318 such that the main exhaust passages 308, 310 communicate with the expansion chamber 318.

The expansion chamber 318 is disposed within the upper housing 78 and is arranged such that at least a portion of the expansion chamber 318 lies below a water line WL when the outboard motor 70 is mounted to a watercraft which is at rest. Additionally, a volume of space between the expansion chamber 318 and the casing 78 defines a water wall 320.

The expansion chamber 318 includes an outlet end at a lower portion thereof which communicates with a discharge path defined in the lower casing 86. In operation, exhaust gases from the combustion chambers 118, 120 are guided through the exhaust ports 298, 300, through the main exhaust passages 308, 310 and the into expansion chamber 318. The expansion chamber 318 quiets noises traveling with the exhaust gases and is preferably tuned to generate desirable reflection waves to the exhaust ports 298, 300, as known in the art. Exhaust gases leave the expansion chamber 318 and are discharged outwardly through the propeller 88.

With the continued reference to the lower left-hand portion of FIG. 1, the outboard motor 70 preferably also includes an exhaust catalyst arrangement, indicted generally by the reference numeral 322. The exhaust catalyst arrangement 322 includes a branched exhaust passage 324 having an inlet end connected to the main exhaust passage 310 and an outlet end connected to a catalyst device 326. Preferably, a further exhaust passage extends between the main passages 308, 310 such that both of the main exhaust passages 308, 310 can communicate with the inlet of the branched exhaust passage 324.

The catalyst device 326 preferably have a composition which helps to catalyze unburned hydrocarbons present in the exhaust gasses discharged from the combustion chambers 118, 120, as known in the art. For example, an oxidization catalyst with a specific surface area of about 30 $m^2$ and comprising metal coated with platinum (Pt) and rhodium (Rh) at a ratio of 5:1 can be used. The rate of hydrocarbon cleaning preferably is approximately 93% or more and the rate of CO cleaning preferably is approximately 55% or more. The catalyst preferably also contains a 18Cr-3AI intermediate cylinder that is preferably soldered to a stainless steel outer cylinder. The intermediate cylinder preferably houses a 20Cr-5Al-REM honeycomb. The catalyst activation temperature is typically about 170–250° C.

The catalyst arrangement 322 also includes a discharge passage 328 with an inlet end communicating with the catalyst device 326 and an outlet end 329. In the illustrated embodiment, the outlet end 329 of the exhaust passage 328 communicates with the expansion chamber 318, described in more detail below.

The catalyst arrangement 322 also includes a catalyst temperature sensor 330 which is configured to sense a temperature of the catalyst device 326. The temperature sensor 330 is connected to the ECU 144 via temperature sensor data line 332. As such, the ECU 144 can receive a signal from the sensor 330 which is indicative of the temperature of the catalyst device 326.

The catalyst arrangement 322 can be configured such that when the engine 72 is idling, and thus the watercraft associated with the outboard motor 70, is approximately at rest or moving slowly, substantially all of the exhaust gases traveling through the main exhaust gases traveling through the main exhaust passages 308, 310 are diverted into the branched passage 324 and through the catalyst device 326. For example, as shown in the lower left-hand portion of FIG. 1, the lower ends of the exhaust pipes 314, 316 are approximately at the water line WL. Thus, when the watercraft and outboard motor 70 are at rest, water from body of water in which the outboard motor 70 is operating, fills the expansion chamber 318 up to the water line WL. The water thus causes some back pressure within the main passages 308, 310. This back pressure helps to urge the exhaust gases to be diverted from the main exhaust passages 308, 310 and in to the branch exhaust passage 324. Thus, the exhaust gases flowing therethrough travel into the catalyst devise 326 and through the discharge passage 328 into the expansion chamber 318.

Thus, when the outboard motor 70 is idling, substantially all of the exhaust gases generated in the combustion chamber 118, 120, are directed through the catalyst device 326 wherein unburned hydrocarbons are catalyzed and thus removed from the exhaust gases. By removing the unburned hydrocarbons, the generation of smoke from the outboard motor is dramatically reduced. Thus, when passengers within a watercraft associated with the outboard motor 70 are seated within the watercraft when the outboard motor 70 is only idling or moving the watercraft at low speed, the passengers are not subjected to smoke which is normally generated by outboard motors without catalyst devices.

On the other hand, when the outboard motor 70 is running at higher speed, the water line WL moves downwardly to a position just above the propeller 88, particularly when the associated watercraft is planing. Additionally, the flow of exhaust gases through the main exhaust passages 308, 310, is sufficient to push much of the water out of the expansion chamber 318 and the lower case 86 until the expansion chamber 318 and lower case 86 are nearly devoid of water. Thus, substantially all of the exhaust gases leaving the expansion chambers 118, 120, flow through the outlet ends of the exhaust pipes 314, 316. As such, the catalyst device 326 does not greatly contribute to back pressure within the exhaust system 296 during higher speed operation.

Additionally, because all of the exhaust gases at higher engine speeds do not pass through the catalyst device 326, the catalyst device 326 does not need to be as large as a catalyst device which is used to treat all of the exhaust gases flowing out of an engine. Thus, by constructing the exhaust catalyst arrangement 322 as such, a smaller catalyst device can be used while maintaining the smoke removing function during idling, when passengers of an associated watercraft are most likely to be subjected to such smoke.

With reference to the lower left-hand portion of FIG. 1, the exhaust system 296 can also include exhaust valves 334, 336 disposed in the main exhaust passages 308, 310, respectively, and downstream from the merging portion of the exhaust manifold 302. The valves 334, 336, are mounted on an exhaust valve shaft 338. The shaft 338 is journaled for rotation within the exhaust guideplate 312, described in more detail below. The valves 334, 336 are flap-type valves, however, any other type of valve could also be used, such as, for example, but without limitation, butterfly valves.

The shaft 338 is also connected to a motor 340 which is configured to move the valves 334, 336 at least between an open position, in which the main exhaust passages 308, 310 are opened and a closed position, in which the main exhaust passages 308, 310 are closed. The motor 340 is connected to the ECU 144 via an exhaust valve drive motor control line 342. Thus, the ECU 144 can control the orientation of the valves 334, 336 as desired.

Figure 3:
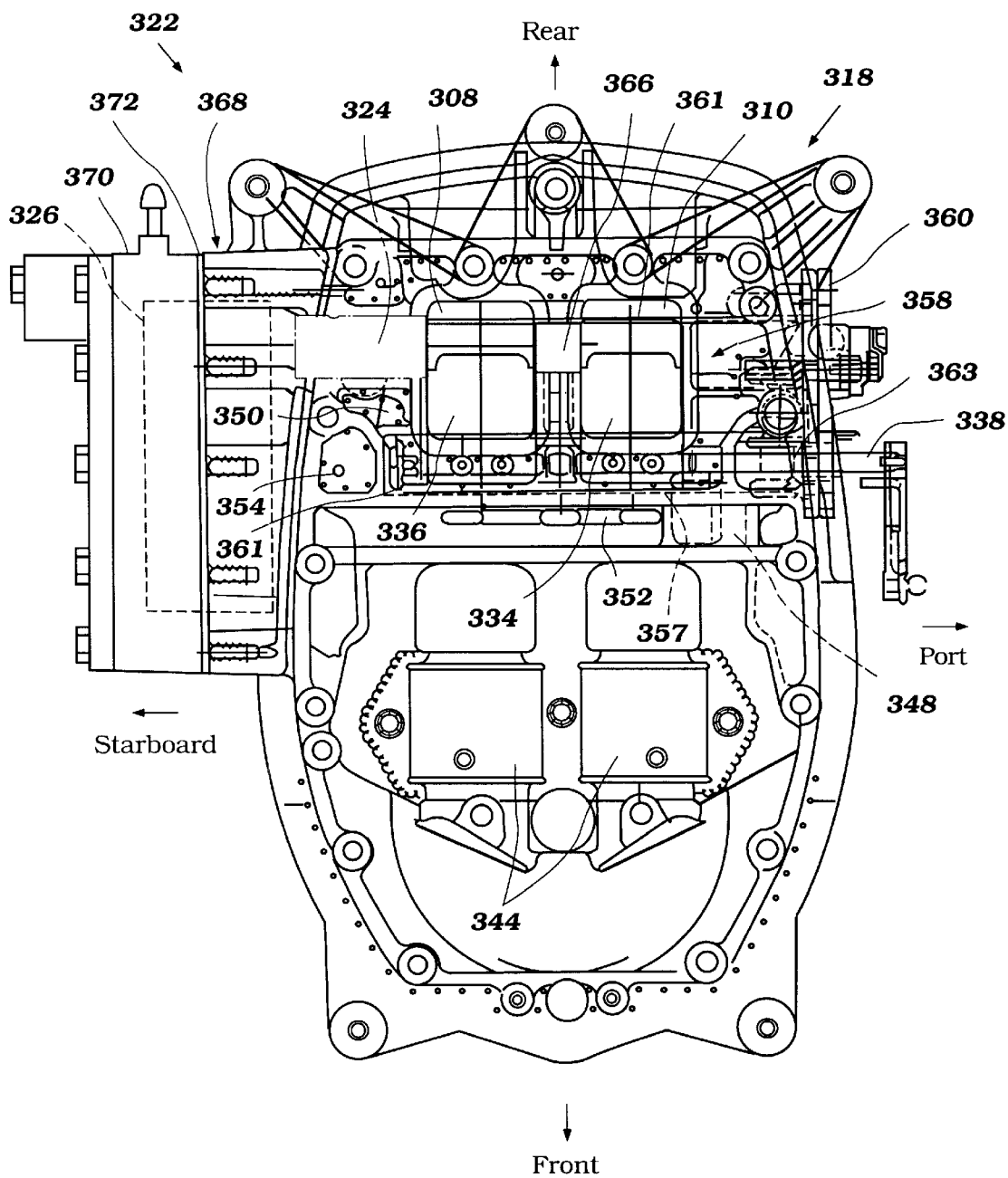
FIG. 3 is a top plan view of an exhaust guideplate which supports the engine of the outboard motor illustrated in FIG. 1.
Figure 4:
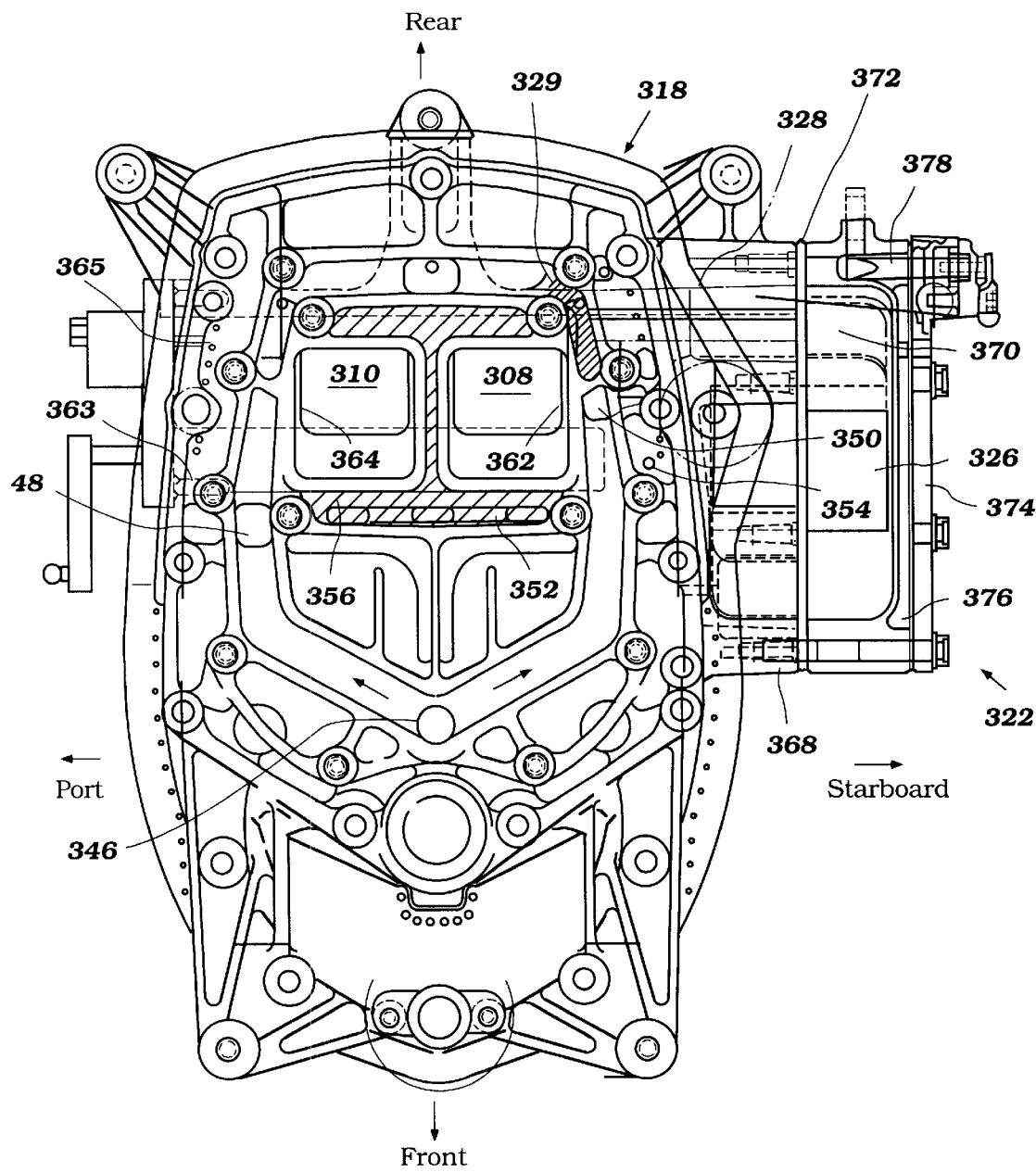
FIG. 4 is a bottom plan view of the exhaust guideplate illustrated in FIG. 3.
Figure 6:
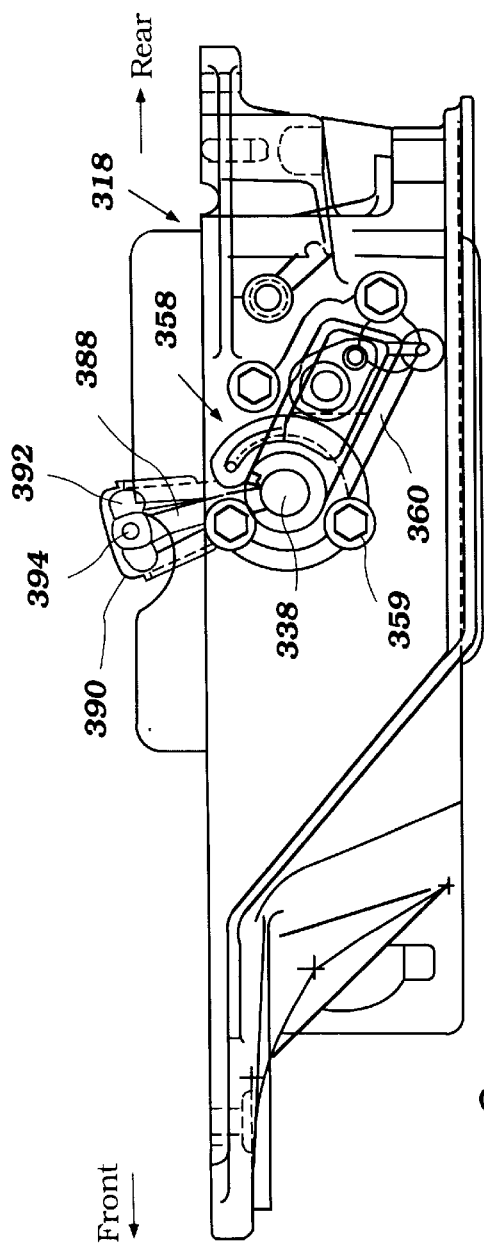
FIG. 6 is a port side elevational view of the exhaust guideplate illustrated in FIGS. 3 and 4.

With reference to FIGS. 3 and 4, and as noted above, the exhaust guideplate 318 supports the engine 72. The exhaust guideplate 318 thus includes engine mounts 344 which support the engine 72 in a known manner.

With reference to FIG. 4, which shows a bottom plan view of the exhaust guideplate 318, cooling passages are defined within the guideplate 318. For example, the exhaust guideplate 318 includes a coolant supply aperture 346. The coolant supply aperture 346 is supplied with water from the water pump 292 and directs the cooling water to various other water holes 348, 350. As the water flows through the guideplate 318 it helps cool the components which are heated by exhaust gases flowing therethrough. The water then is supplied upwardly to the engine body 72 through the supply apertures 348, 350. After the water flows through the engine body 92, and thereby cools the engine 72, the cooling water is returned to the exhaust guideplate through return apertures 352 and 354. The return aperture 352 is oriented so as to direct cooling water into the expansion chamber 318. Thus, the cooling water is used to further cool the exhaust gases which has other desirable effects for the tuning the expansion chamber 318. The return aperture 354 directs cooling water into the water wall 320 which is used to further cool the expansion chamber 318.

With reference FIG. 4, preferably, a plate 356 (illustrated with cross-hatching for clarity) covers the return apertures 352. Additional holes (not shown) communicate with flanges which mount the exhaust pipes 314, 316 to the portions of the exhaust guideplate 318 which define part of the main exhaust passages 308, 310, respectively. As such, cooling water returning from the engine 72 is injected into the exhaust pipes 314, 316 and thus mixes with exhaust gases entering the expansion chamber 318.

Preferably, the exhaust guideplate 318 is also provided with an aperture 357 which is sized to receive an exhaust valve assembly 358. The exhaust valve assembly 358 includes a flange 360 which is connected to the guide plate 318 with bolts 359. The exhaust valve assembly 358 also includes a valve body 361 which is supported by the flange and journals the exhaust valve shaft 338 and thereby supports the valves 334, 336.

The valves 334, 336 preferably are cooled by cooling water flowing through the cooling system 290. With reference to FIG. 3, the exhaust guide plate 318 includes a water inlet 363 which allows water to flow into thermal communication with the valves 334, 336. Additionally, the guide plate 318 includes a return port 365 (FIG. 4) which allows the cooling water to return to another passage of water flowing through the guide plate 318. Preferably, the inlet 363 and the return port 365 connect with a cooling water inlet and outlet (not shown) disposed on the flange 360.

With reference to FIG. 3, the exhaust guideplate 318 also includes a main exhaust connection passage 366 which connects the apertures 362, 364 with each other. In the illustrated embodiment, the main exhaust connection passage 366 is approximately aligned with the branched exhaust passage 324, however, the connecting passage 366 could be disposed anywhere between the apertures 362, 364.

As shown in FIG. 3, the catalyst assembly 322 includes the base portion 368 and a cover portion 370. A flange portion 372 connects the base portion 368 with the cover portion 370. The catalyst device 326 is disposed between the base portion 368 and the cover portion 370.

Preferably, the base portion 368 is formed monolithically with the exhaust guideplate 318. However, it is conceived that the base member 368 could also be formed separately and secured to the exhaust guideplate 318 in any known manner. The cover 370 is secured to the base portion 368 preferably with a plurality of bolts. With reference to FIG. 3, the catalyst device 326 is cylindrical in shape with a longitudinal axis 369 extending generally parallel to the flange 372.

With continued reference to FIG. 3, the branched exhaust passage 324 extends into an interior of the catalyst assembly 322. With reference to FIG. 4, the return passage 328 also extends to an interior of the catalyst assembly 322. Thus, in operation, exhaust gases flowing through the main exhaust passages 308, 310, under the circumstances noted above, are diverted into the connection passage 366 and the branched passage 324 so as to direct exhaust gases into the catalyst assembly 322. The exhaust gases flow through the catalytic device 326 wherein unburned hydrocarbons are catalyzed. The exhaust gases then return into the exhaust guideplate 318 through the return passage 328 and then to the expansion chamber 318.

Preferably, the catalyst assembly 322 also includes a cooling jacket member 374 mounted to the cover 370, so as to define a cooling jacket 376 therebetween. Preferably the cooling jacket 376 is provided with cooling water from the coolant inlet port 346, and coolant passages formed in the base portion 368 so as to cool the catalyst device 326. Preferably, the catalyst assembly 322 also includes a sacrificial anode 378 extending into the cooling jacket 376 so as to prevent corrosion of the catalyst device 326.

Figure 5:
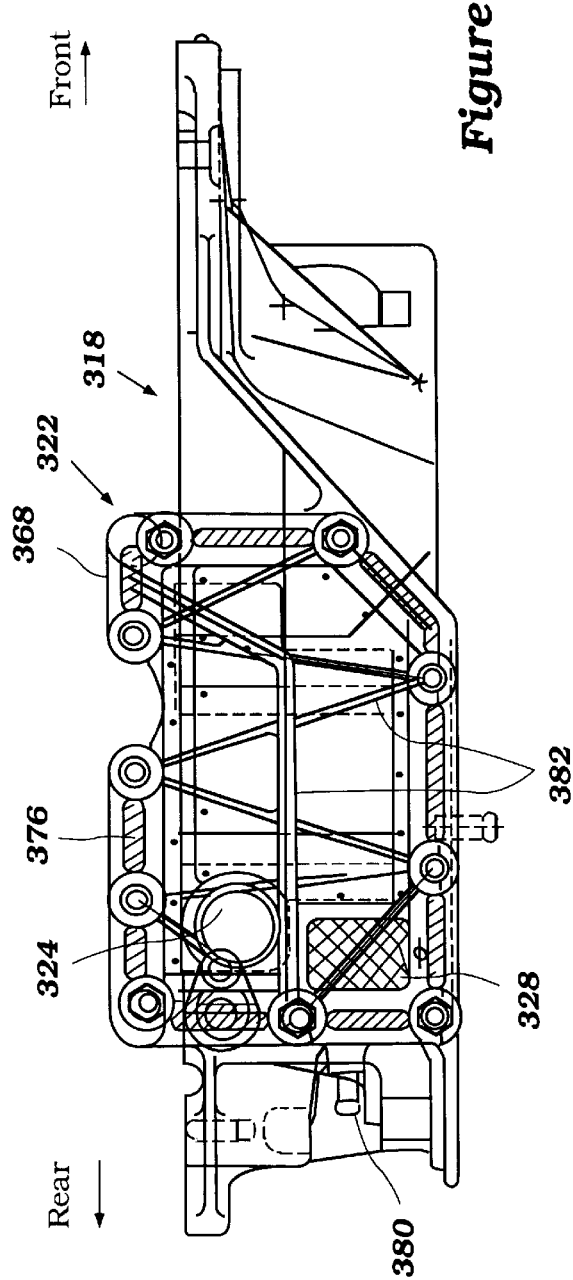
FIG. 5 is a starboard side elevational view of the exhaust guideplate illustrated in FIGS. 3 and 4 showing a catalyst device assembly with a cover and cooling jackets illustrated with cross-hatching.

Also preferably, in order to provide a visual reference to ensure proper cooling of the catalyst device 326, the catalyst device assembly 322 includes a telltale port 380. As show in FIG. 5, the telltale port 380 is directed rearwardly from the cooling jacket 376 and is configured to bleed cooling water from the cooling jacket 376 so that a user can visually verify that cooling water is flowing through the cooling jacket 376. Additionally, the cover 370 preferably includes ribs 382 for providing additional strengthening of the cover 370.

Although not illustrated in FIG. 3 the motor 340 can be connected to the shaft 338 in any known manner so as to provide control over the movement of the valves 334, 336. Preferably, the motor 340 is of the type which can provide proportional control over the actuation of the valves 334, 336, under the control of the ECU 144.

With reference FIGS. 3, 4, 6 and 17, in addition or in lieu of the motor 340, the valve drive assembly 360 can include a linking mechanism 384 which is configured to operate the valves 334, 336 based on another user changeable input parameter.

Figure 7:
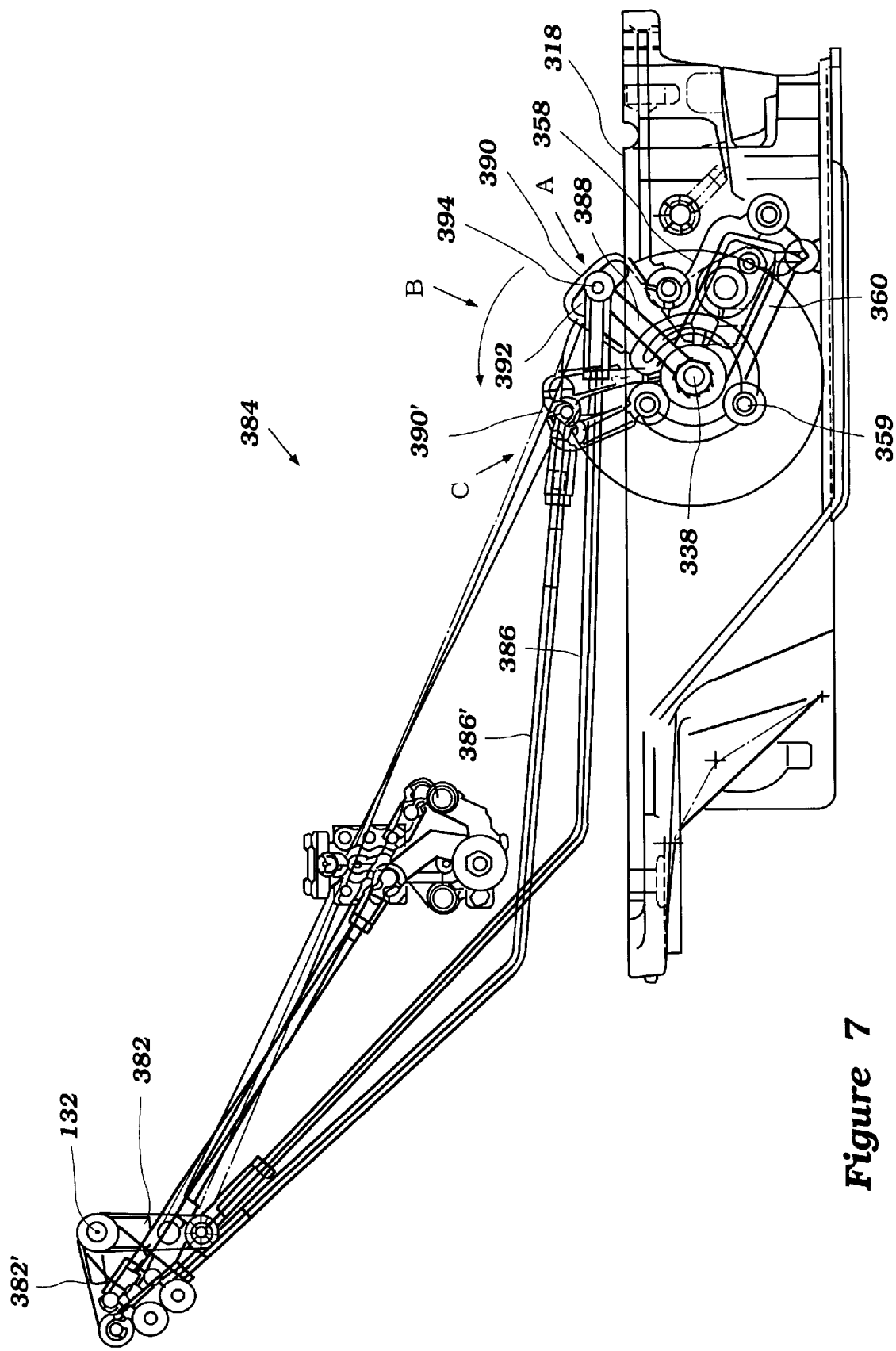
FIG. 7 is a port side elevational view of the exhaust guideplate illustrated in FIGS. 3 and 4, including a modification of the exhaust valve drive control illustrated in FIG. 1.

As shown in FIG. 7, the assembly 384 includes a pivot arm 382 attached to the throttle valve shaft 132 so as to pivot therewith. The link assembly 384 also includes a link rod 386 which is connected to an exhaust valve control lever 388. The exhaust valve control lever 388 is attached to the exhaust valve shaft 338 at its inner end so as to pivot therewith. Additionally, at its outer end, the exhaust valve control lever 388 includes a connection portion 390 defining a slot 392. The rod 386 includes a pin 394 attached thereto. The pin 394 extends into the slot 392. The slot 392 and the pin 394 are configured such that the pin 394 can move at least a predetermined distance relative to the lever 388 without causing the lever 388 to move.

Preferably, the exhaust valve control lever 388 is biased towards a position, indicated y the letter "A" in which the valves 334, 336 substantially close the main exhaust passages 308, 310. In the position A, the throttle valve shaft 132 is in an idling position. When the throttle valve shaft is moved to a fully open position, the throttle valve lever 382 is moved to the position indicated by 382'.

When the throttle valve lever 382 is moved to the position 382', the rod 386 is thereby moved to the position indicated by the numeral 386'. When the rod 386 begins to move, the pin 394 slides within the slot 392 until it reaches the end thereof. Then the lever 388 is moved in the direction, indicated by arrow B, until the lever reaches the position indicated by the letter "C", wherein the connection portion 390 is identified by the reference numeral 390'. In the position C, the exhaust valves 334, 336 and the throttle valves 130 are fully opened, thereby allowing substantially all of the exhaust gases to flow through the main exhaust passages 308, 310.

Figure 8:
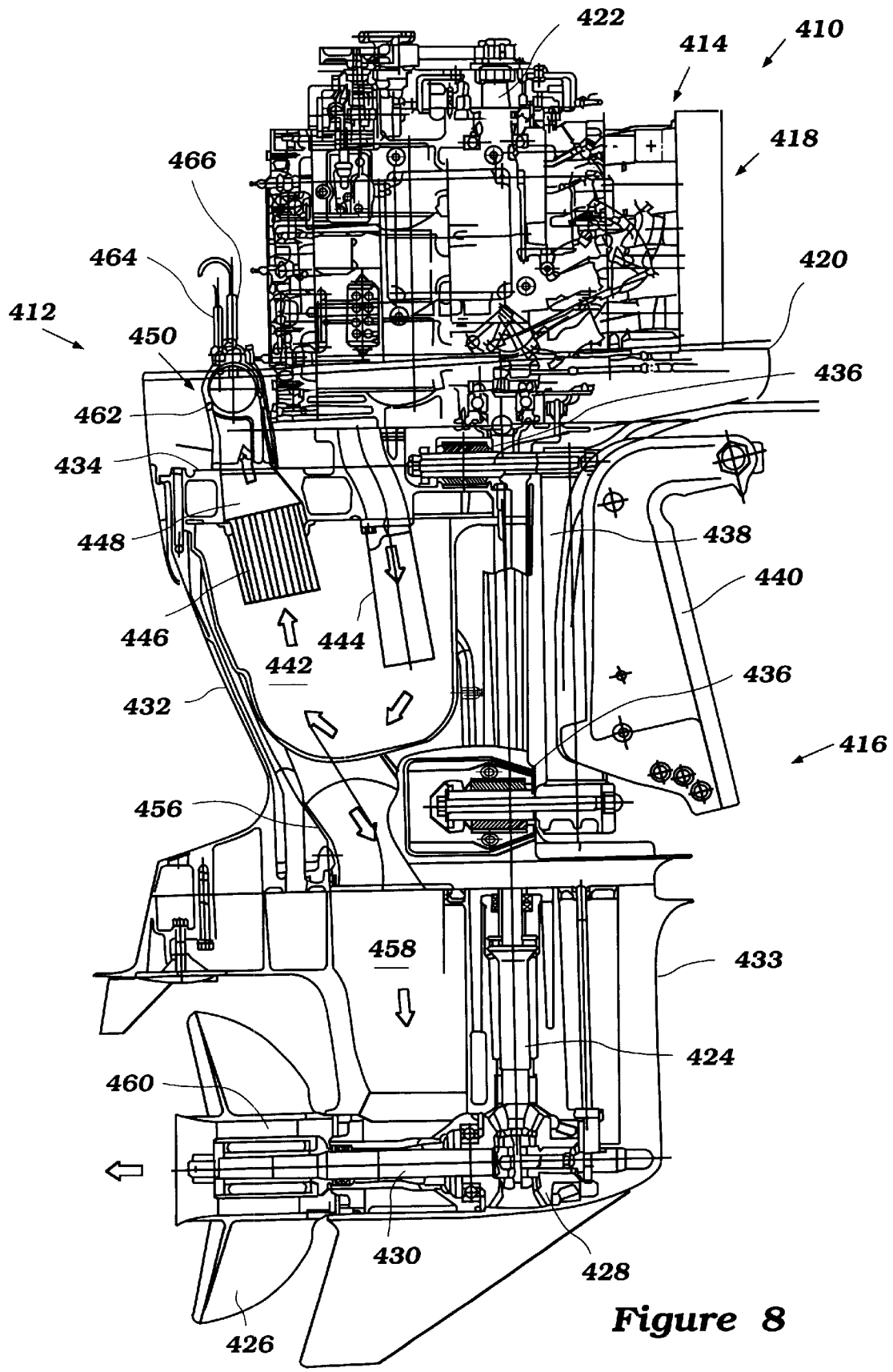
FIG. 8 is a side elevational and partial sectional view of an outboard motor having a modified exhaust system from that illustrated in FIG. 1, the upper cowling of the outboard motor is removed.
Figure 9:
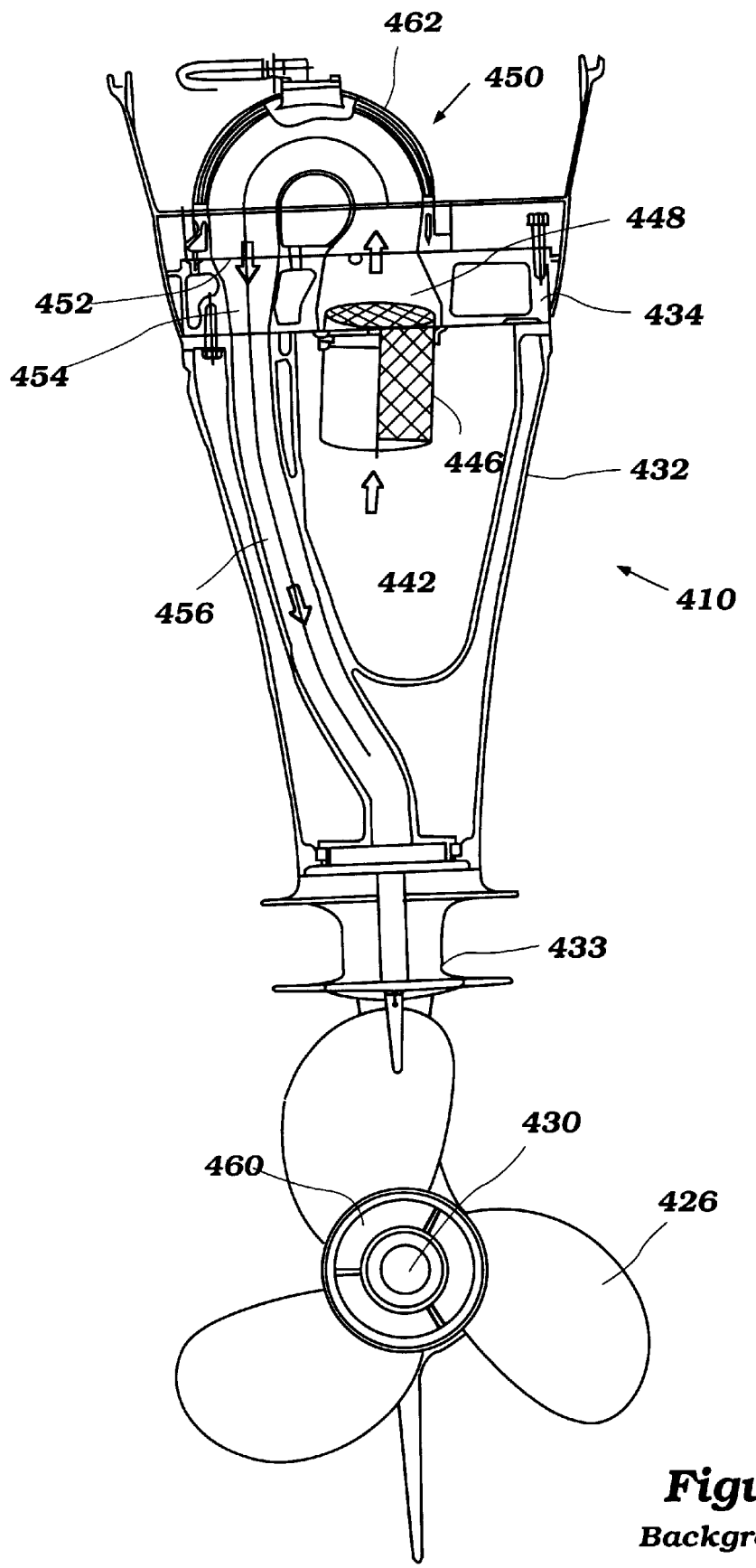
FIG. 9 is an enlarged partial rear elevational and partial sectional view of the outboard motor illustrated in FIG. 8.

FIGS. 8 and 9 illustrate a modified outboard motor 400, which can utilizes the control system 74 described above and in more detail below. As will be apparent from the description below, the modified outboard motor 400 is similar to the outboard motor 70 shown in FIGS. 1–7 except for the exhaust system 412. More specifically, in the exhaust system 412 of this arrangement, all of the exhaust gases from the expansion chamber flow through the catalyst device.

As with the previous arrangement, the outboard motor 400 includes a powerhead portion 414 with a drive shaft housing and lower unit portion 416 which depends from the powerhead 414. The powerhead 414 includes an internal combustion engine 418. The engine 418 is surrounded by a protective cowling, which includes an upper cowling portion (not shown) and a lower tray portion 420.

The engine 418 is mounted in the outboard motor 400 such that its crankshaft 422 rotates about a vertically-extending axis. The crankshaft 422 drives a drive shaft 424 which is journaled within the drive shaft housing and lower unit portion 416.

The drive shaft 424 depends into the lower unit portion where it drives a propeller 426 via a conventional bevel gear reversing transmission 428. The propeller 426 is affixed to a propeller shaft 430 which is driven by the transmission 428. As such, as the drive shaft rotates and drives the transmission 428 and the propeller 426.

The drive shaft housing and lower unit 416 includes an upper case portion 432 which is generally open at its upper end. This open upper end is closed by an exhaust guideplate 434 which also supports the engine 418.

A pair of damper members 436 support the exhaust guideplate 434 and the upper case 432, respectively, relative to a steering or "swivel" shaft 438. The steering shaft is supported by a bracket assembly 440 which, in turn, is connected to the transom of an associated watercraft in a known manner.

The exhaust system 412 of the engine 418 includes an exhaust manifold (not shown) which defines at least a portion of a main exhaust passage that extends from the combustion chambers of the engine 418 into an expansion chamber 442. The main exhaust passage extends through the exhaust guideplate 434 and through an outlet end 444 thereof. The expansion chamber 442 aids in quieting the noises traveling through the main exhaust passage along with the exhaust gases.

The exhaust system 412 also includes a catalyst device 446 disposed in an outlet 448 of the expansion chamber 442. Unlike the outboard motor 70 shown in FIGS. 1–7, the catalyst device 446 is positioned in the outlet 448 such that substantially all of the exhaust gases flowing into the outlet 448 from the expansion chamber 442 passes through the catalyst device 446. The outlet 448 of the expansion chamber 42 extends through the exhaust guideplate 434 into an upper or a "riser" exhaust passage 450.

With reference to FIG. 9, the riser portion 450 has a generally inverted U-shape. An outlet end 452 of the riser portion 450 connects to a further exhaust passage 454 which extends through the exhaust guideplate 434. An additional exhaust pipe 456 is connected to the exhaust passage 454 and extends downwardly through the upper case 432 toward the lower case 433.

With reference to FIG. 8, the lower case 433 includes a passage 458 which connects the exhaust pipe 456 with an exhaust discharge 460 which is positioned within the propeller 426.

Additionally, at least a portion of the exhaust system 412 is cooled by water drawn from the body of water in which the outboard motor 400 is operating. For example, the riser section 450 includes a cooling jacket 462. Additionally, the outboard motor 400 includes a temperature sensor 464 for sensing a temperature of the coolant flowing through the cooling jacket 462. The outboard motor 10 can also include an oxygen sensor 466 which includes an inner end exposed to the exhaust gases flowing through the riser pipe 450.

In operation, exhaust gases generated in the combustion chambers within the engine 418 are directed downwardly by the main exhaust passage into the outlet end 444. Exhaust gases from the outlet end 444 flow into the expansion chamber 442 which thereby attenuates some of the noise associated with the exhaust gases.

All of the exhaust gases from the expansion chamber 442 flow through the catalyst device 446 and upwardly into the riser pipe 450. With reference to FIG. 9, exhaust gases flow upwardly into the riser portion 450 and laterally toward the port side of the outboard motor 400, then downwardly into the exhaust pipe 456. As shown in FIG. 8, exhaust gases from the exhaust pipe 456 flow into the exhaust passage 458 formed in the lower unit housing 433 and through the discharge 460 formed on the propeller 426. Thus, exhaust gases are further quieted by being discharged below the water surface level of the body of water in which the outboard motor 400 is being operated. Additionally, by directing the exhaust gases upwardly into the riser portion that is disposed above the exhaust guideplate 434, the riser portion 450 forms a watertrap which helps in preventing water from flowing upwardly through the exhaust pipe 456, through the riser pipe 450, and making contact with the catalyst device 446.

The engine control system 74 having certain features and advantages according to the present invention will now be described in more detail. It should be appreciated that the engine control system 74 can be used with either of the two outboard motors 70, 400 described above. As mentioned above, the ECU 144, which is part of the engine control system 74, outputs signals to the fuel injectors 146, the spark plugs 142, and the fuel pump 166 for their respective control. To control the engine 72, the control system 74 utilizes control maps and/or indices stored within the memory of the ECU 144.

It should be noted that the ECU 144 may be in the form of a hardwired feed back control circuit that can perform the functions described below. Alternatively, the ECU may be constructed of a dedicated processor and a memory for storing a computer program configured to perform the functions described below. Additionally, the ECU can be a general purpose computer having a general purpose processor and memory for storing a computer program that performs the functions described below.

As mentioned above, the performance of the catalyst 326 is affected by the temperature of the exhaust gases. For example, the catalyst 326 is typically not activated until the exhaust gas entering the catalyst reaches approximately 170–300° C. To achieve this temperature in the exhaust gas, the engine typically needs to be operated at an engine speed greater than 2000–3500 RPM. However, outboard motors are often operated for long periods of times at very low engines speeds or idle. During such periods, the exhaust temperature is usually about 100° C. Such exhaust temperatures are insufficient for activating the catalyst. As such, at low engine speeds the catalyst may be inactive.

Figure 10A:
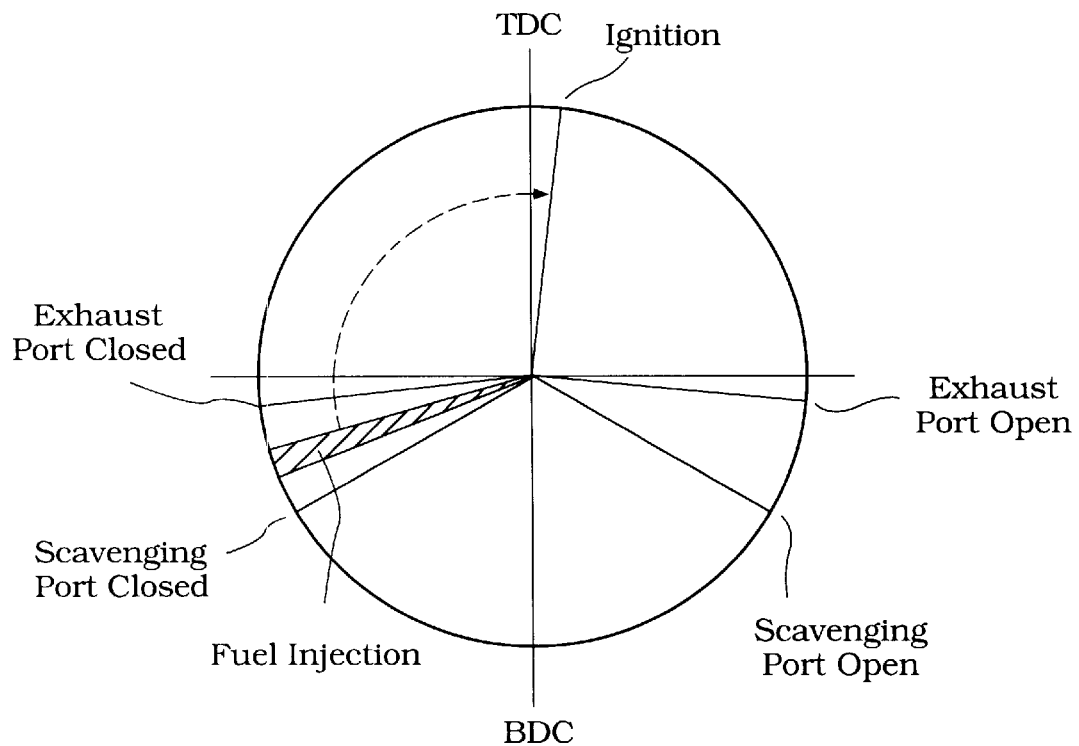
FIG. 10A is a timing diagram showing the valve timing, injection timing and ignition timing during low-speed operation of a two-stroke engine.
Figure 10B:
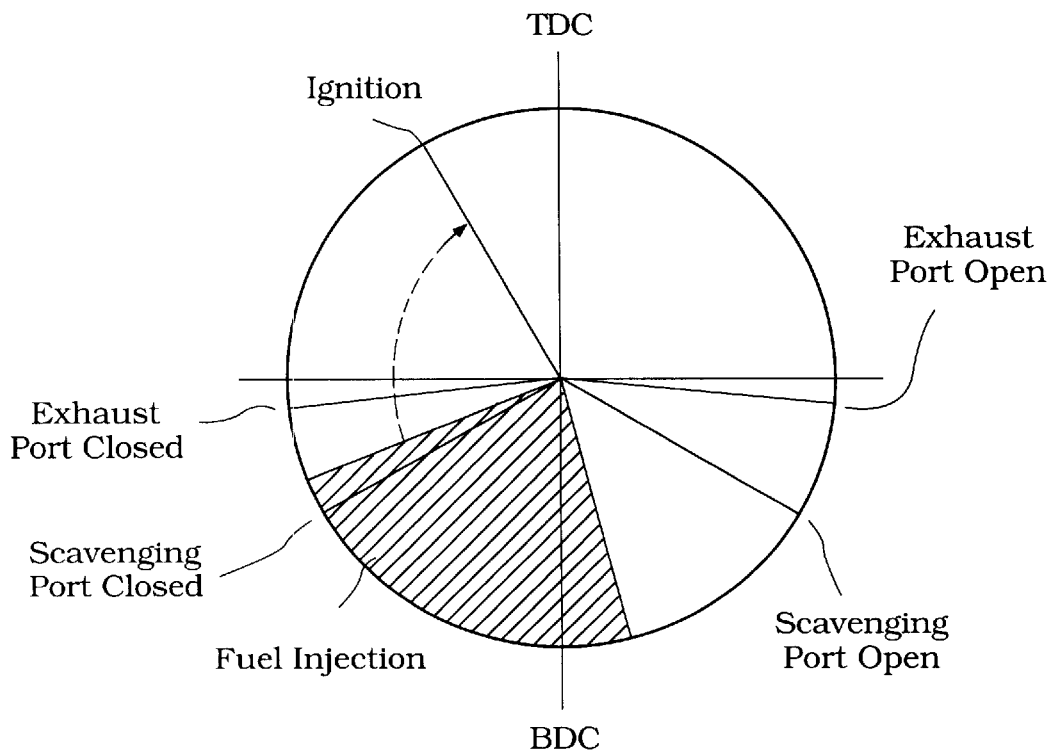
FIG. 10B is a timing diagram showing the valve timing, injection timing and ignition timing during high-speed operation of a two-stroke engine.

To enhance the performance of the catalyst 326, the ECU 144 of the engine control system 74 preferably includes a control map similar to the one illustrated in FIGS. 10A and 10B. FIG. 10A is a timing diagram/map showing a preferred timing of (i) the opening and closing of the exhaust port 300 and scavenging ports 135, 137, (ii) the fuel injection timing and (iii) the firing of the spark plug 142 (i.e., ignition timing) during low-speed operation of the engine 72. As mentioned above, the illustrated engine 72 is a two-cycle engine. As such, the scavenging ports 135, 137 are opened after the exhaust port 300 is opened. In the illustrated arrangement, the fuel injection is initiated after the scavenging ports 135, 137 are closed and is completed before the exhaust port 300 is closed. This arrangement insures that there is sufficient time, as indicated by the dotted line, before ignition for the fuel to fully mix with the air intake charge. As such, the fuel and air are substantially pre-mixed at ignition.

In a similar manner, FIG. 10B is a timing diagram/map showing a preferred timing of (i) the opening and closing of the exhaust port 300 and scavenging ports 135, 137, (ii) the fuel injection timing and duration and (iii) the ignition timing during highspeed operation of the engine 72. The fuel injection is initiated before the scavenging ports 135, 137 are closed and is completed before the exhaust port 300 is opened. This arrangement also insures that there is sufficient time, as indicated by the dotted line, before ignition for the fuel to fully mix with the air intake charge. As such, the fuel and air are substantially pre-mixed at ignition.

Figure 11:
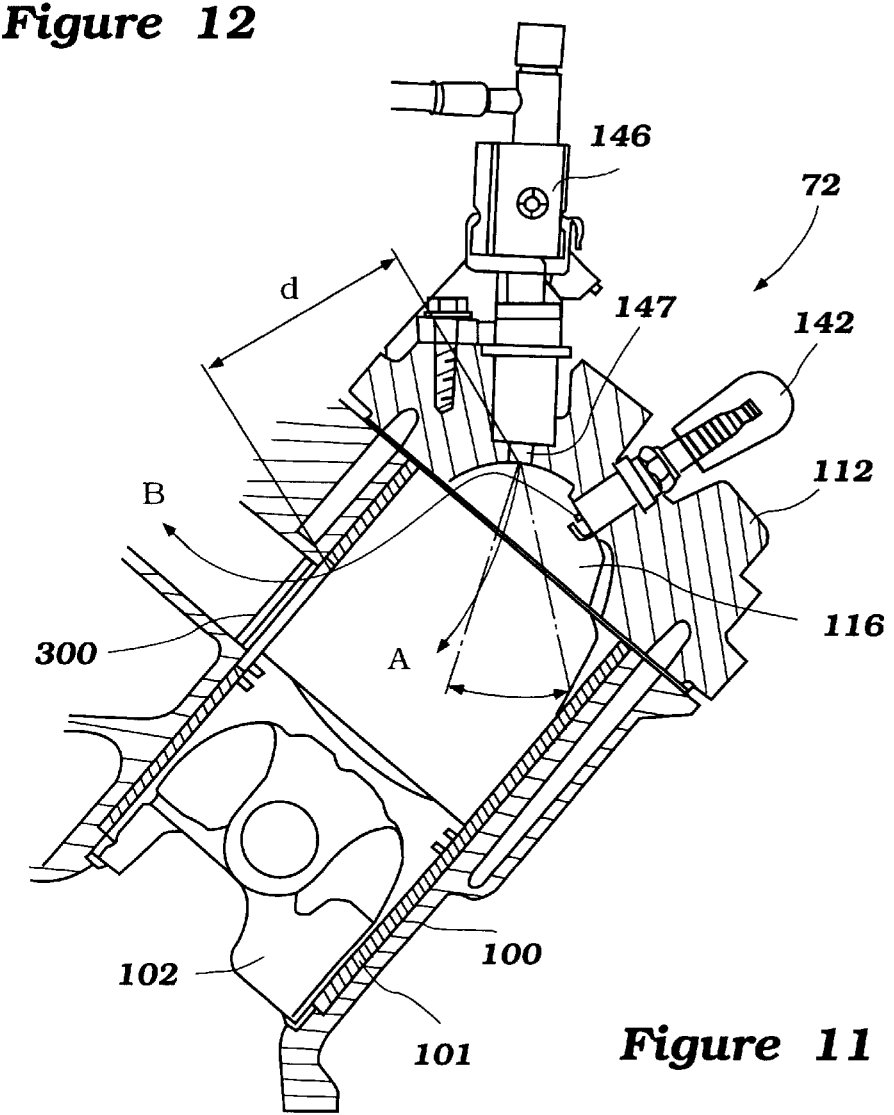
FIG. 11 is a partial cross-section view of a piston, cylinder and cylinder head of the engine of the outboard motor illustrated in FIG. 1 or FIG. 8.

With reference to FIGS. 11 and 12, the timing of the exhaust opening and closing of the exhaust port 300 and scavenging ports 135, 137 is determined primarily by the geometry of the location of these ports 300, 135, 137 inside the cylinder body 102. That is, the exhaust port 300 and the scavenger ports 135, 137 are located at a predetermined height along the sliding direction of the piston 102. This height determines when the ports are opened and closed with respect to top dead center (TDC) and bottom dead center (BDC). In contrast, the timing and amount of the fuel injection and the ignition is controlled by the control system 74, as described above.

Figure 13:
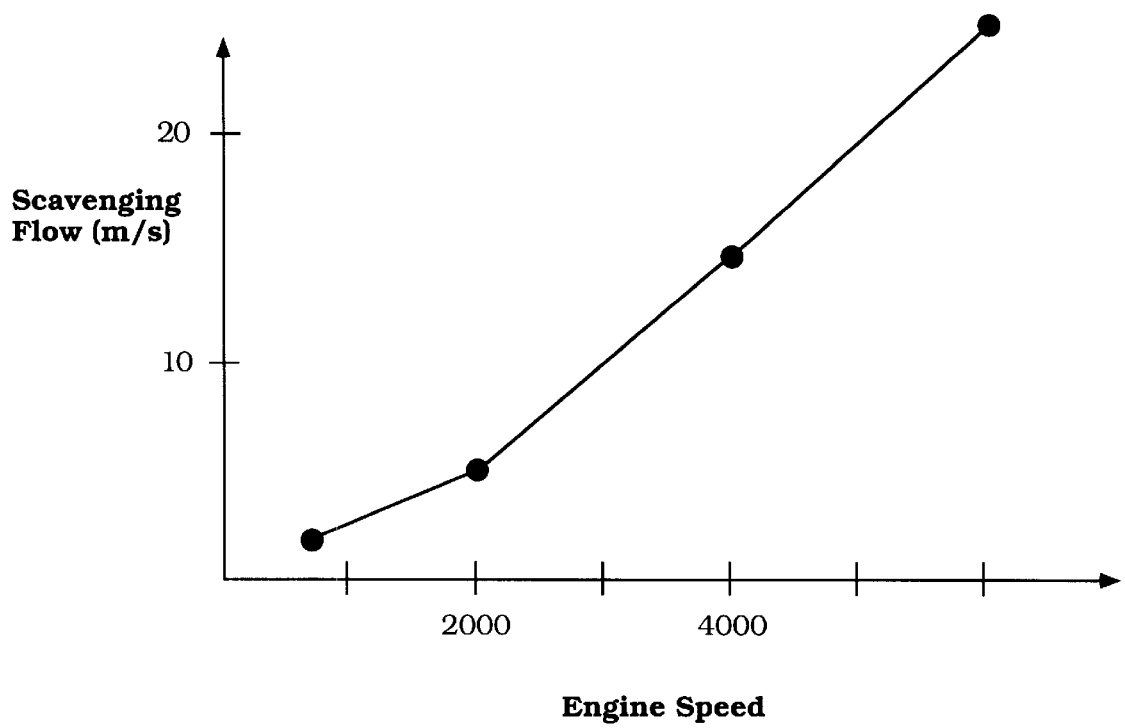
FIG. 13 is a graph illustrating a relationship between scavenging flow and engine speed.

As mentioned above, the fuel injection timing of FIGS. 10A and 10B tends to produce a pre-mixed charge. As shown in FIGS. 11 and 12, the fuel injector 146 preferably injects fuel at an injection angle of approximately 30 degrees (FIG. 10) and the mist preferably has a shape D (FIG. 11). The arrow B shows the preferred scavenging flow in the combustion chamber 116 and arrow C shows the preferred direction of the swirl. As shown in FIG. 13, the scavenging flow tends to increase as engine speed increases. Because the fuel in injected into the combustion chamber 116 before the closure of the exhaust port 308, there is sufficient time for the fuel to mix before ignition. Blow-by is minimized by providing sufficient distance d between the fuel injector nozzle 147 and the upper end of the exhaust port 300.

Figure 14A:
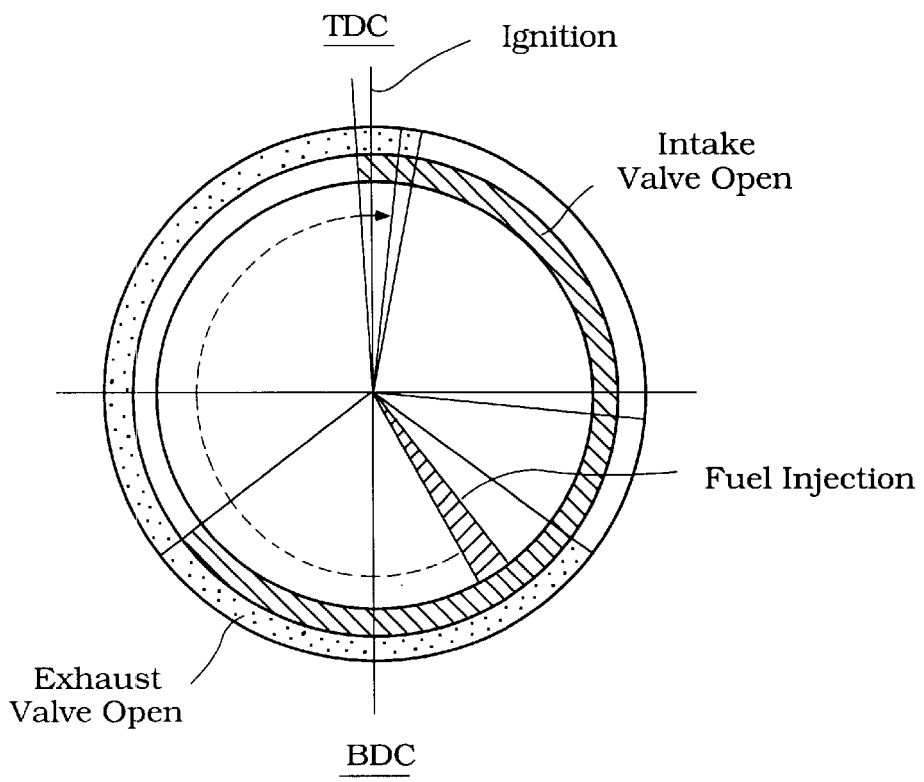
FIG. 14A is a timing diagram showing the valve timing, injection timing and ignition timing during low-speed operation of a four-stroke engine.
Figure 14B:
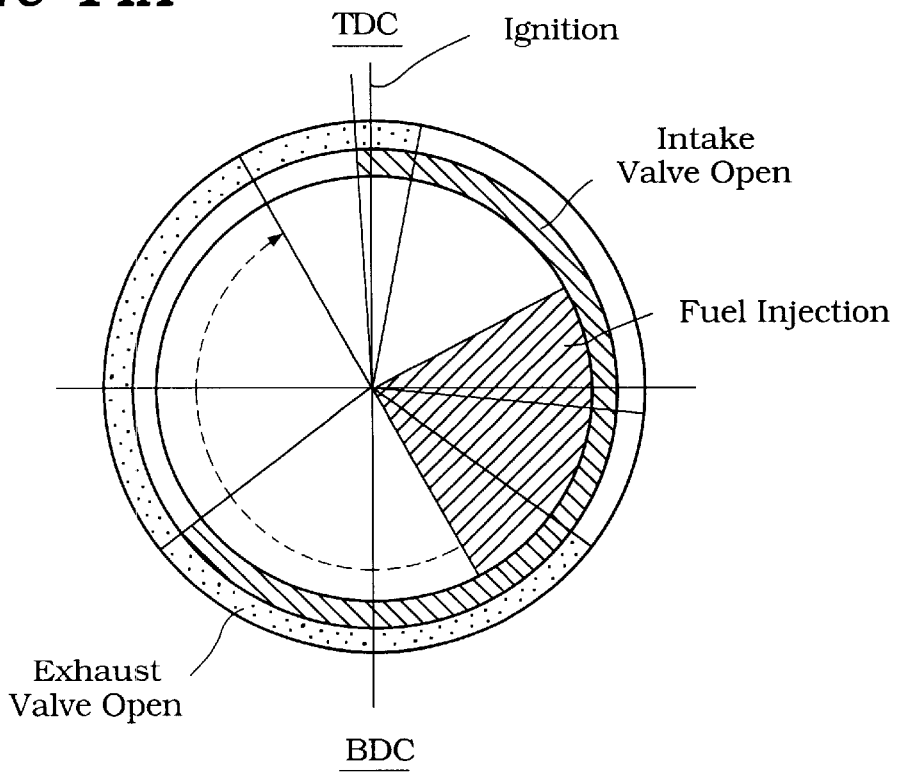
FIG. 14B is a timing diagram showing the valve timing, injection timing and ignition timing during high-speed operation of a four-stroke engine.

In a modified arrangement, the engine 72 can be a four-stroke engine. In such an arrangement, the ECU 144 of the engine control system 74 preferably includes a control map similar to the one illustrated in FIGS. 14A and 14B. FIG. 14A is a timing diagram/map showing a preferred timing of (i) the opening and closing of intake ports and exhaust ports (ii) fuel injection timing and duration and (iii) the ignition timing during lowspeed operation. As with the two cycle arrangement, the timing is arranged such that the fuel and air are pre-mixed before ignition. As such, the fuel injection is competed before the intake valve closes. This supplies sufficient time (dotted line) before ignition for the fuel and air to mix. In a similar manner, FIG. 14B is illustrates the preferred timing of (i) the opening and closing of intake ports and exhaust ports (ii) the fuel injection and (ii) the ignition timing during high-speed operation.

Figure 15:
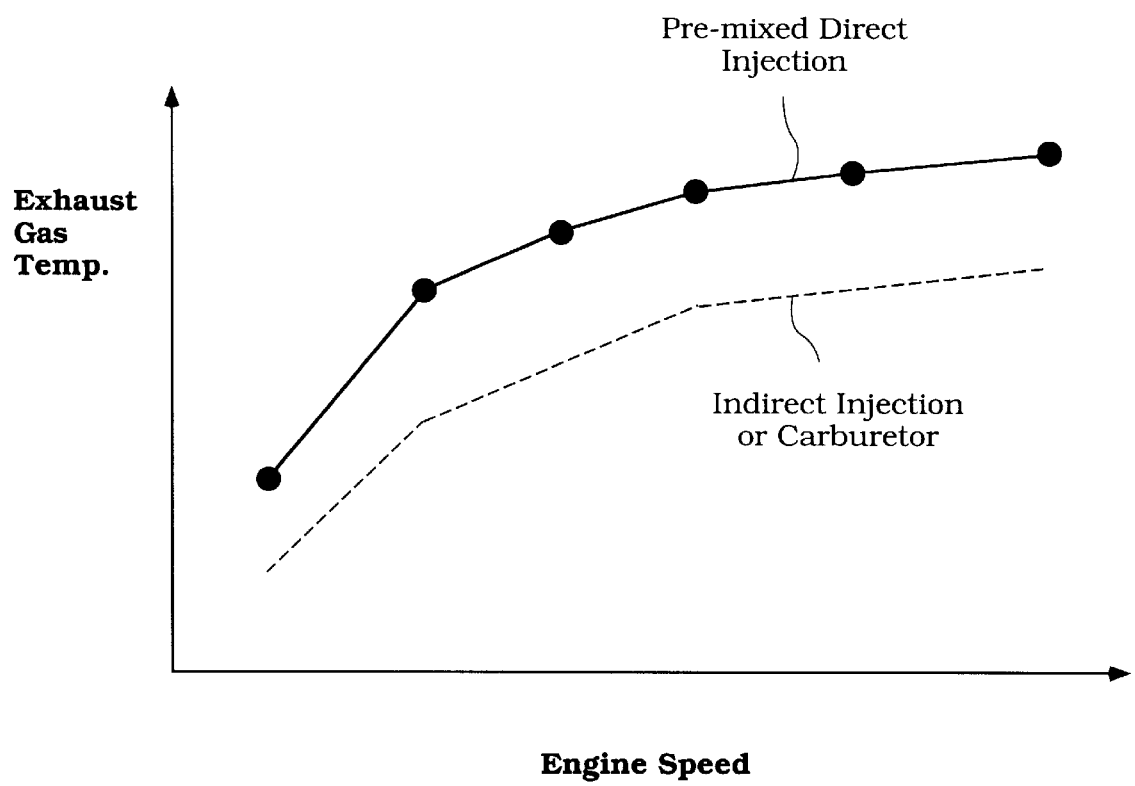
FIG. 15 is a graph illustrating a relationship between exhaust gas temperature and engine speed.

FIG. 15 compares exhaust gas temperature as a function of engine speed for (i) a pre-mixed direct injection type engine as described above and (ii) an indirect injection type engine or an engine with a carburetor. As shown in FIG. 15, for both types of engines, the exhaust gas temperature tends to rise as engine speed increases. However, the pre-mixed direct injection engine has an exhaust gas temperature that is approximately 150° C. higher than the indirect injection or carburated engine. As such, especially at low engine speeds, pre-mixed direct injection advantageously increases the exhaust gas temperature.

Figure 16:
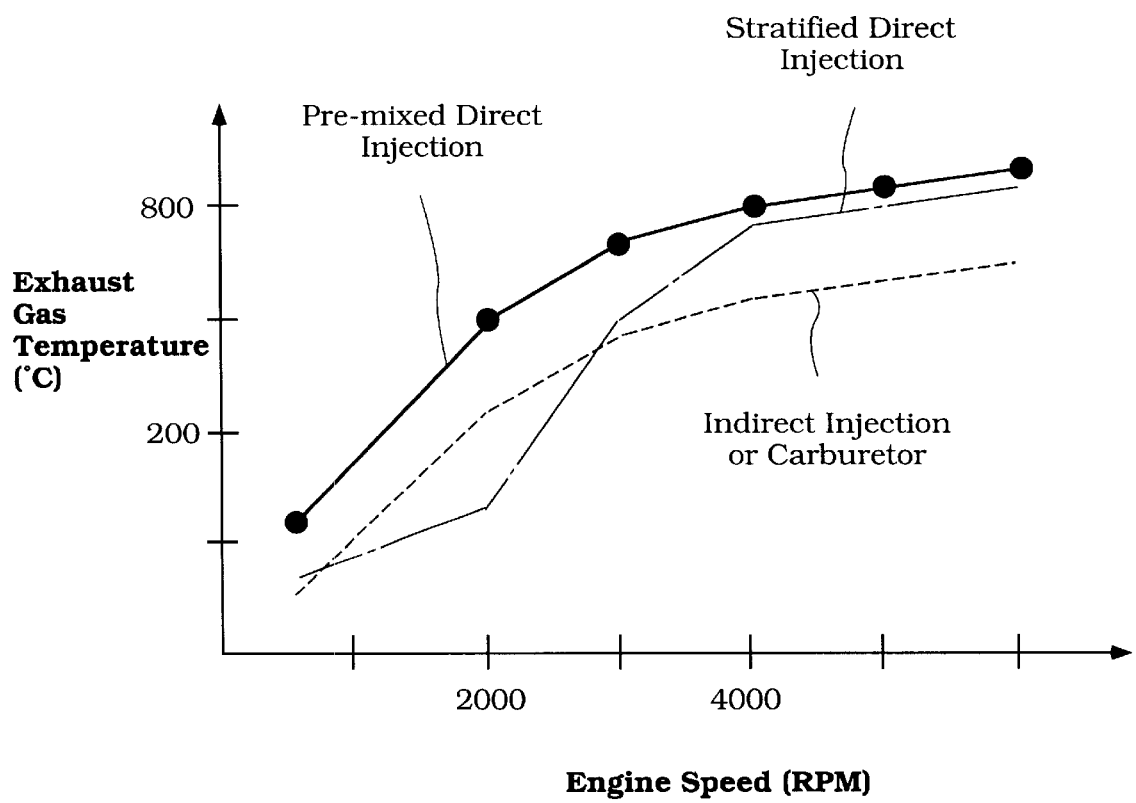
FIG. 16 is another graph illustrating a relationship between exhaust gas temperature and engine speed.
Figure 17:
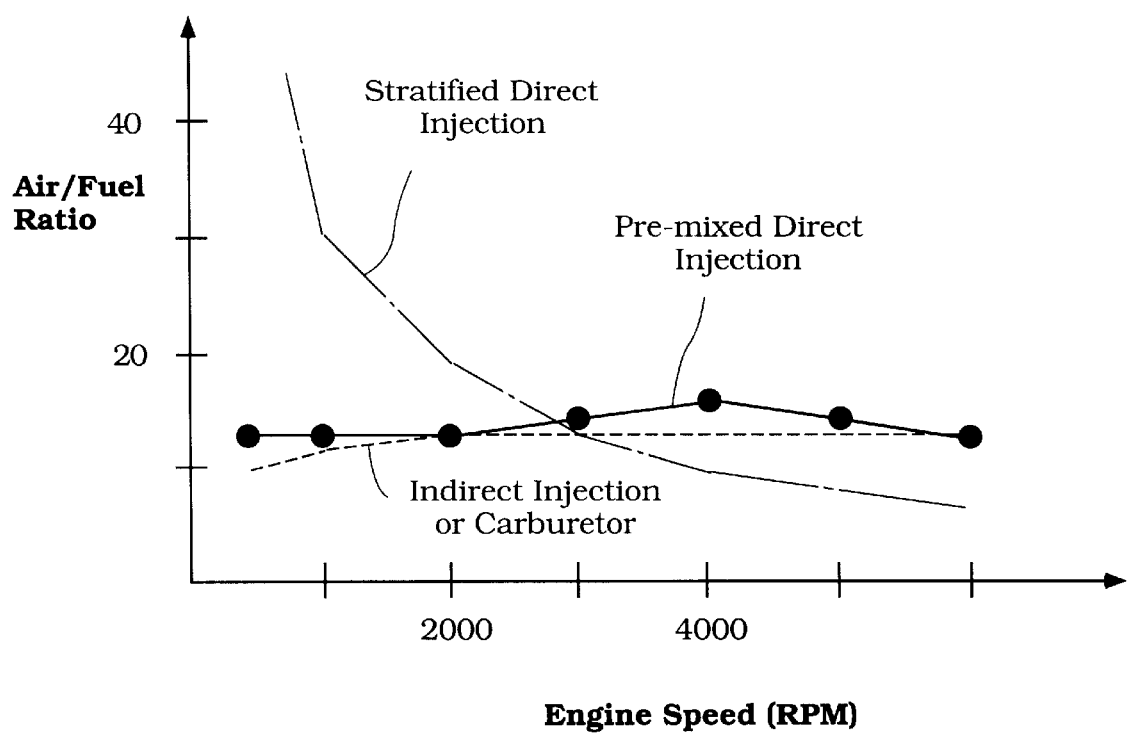
FIG. 17 is a graph illustrating a relationship between air/fuel ratio and engine speed.
Figure 18:
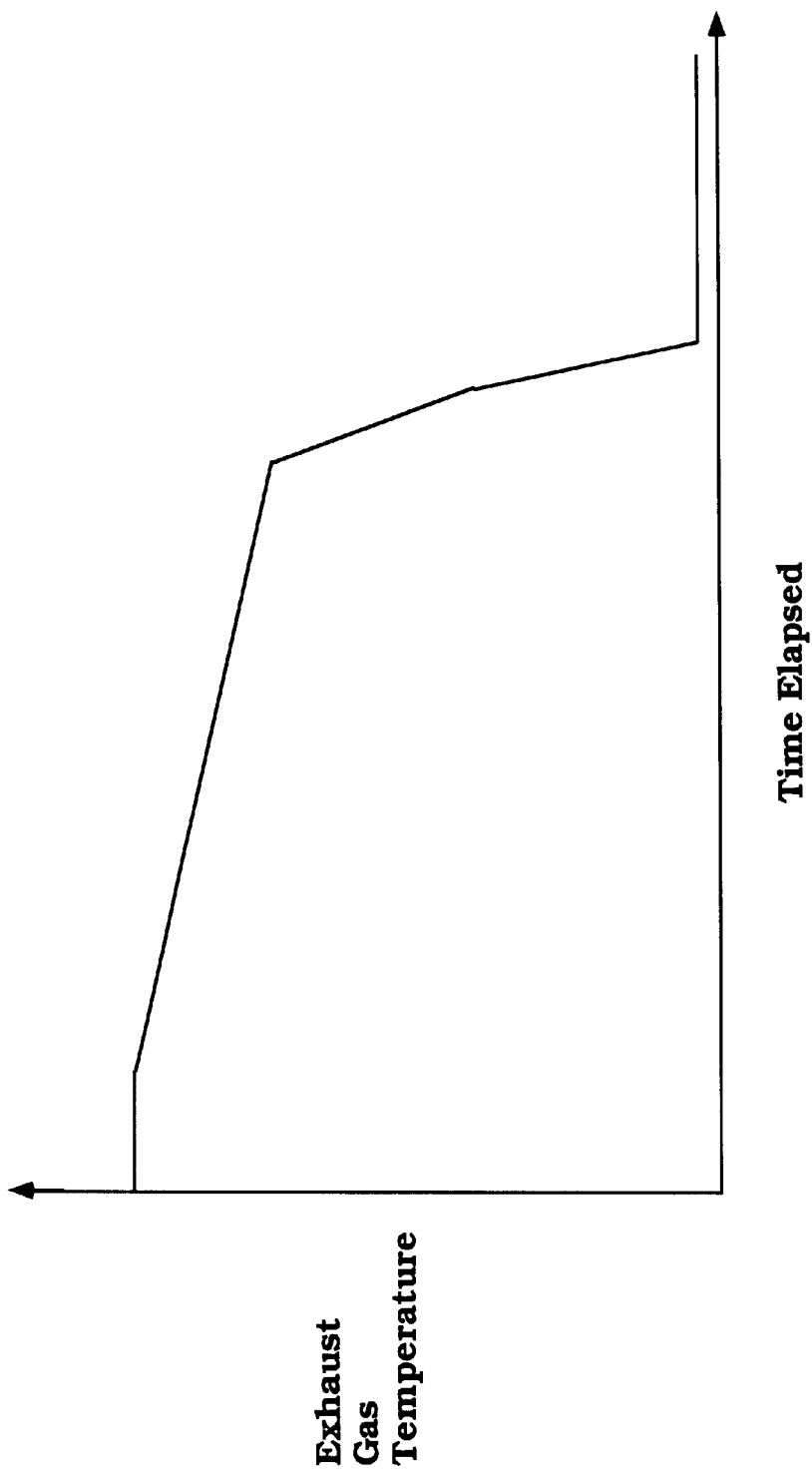
FIG. 18 is a graph illustrating a relationship between exhaust gas temperature and elapsed time at a low engine speed and/or idle.

In a similar manner, FIG. 16 compares the exhaust gas temperature as a function of engine speed for (i) a pre-mixed direct injection engine as described above (ii) an direct injection engine that uses stratified combustion and (iii) an indirect injection or carburated engine. As shown in FIG. 16, the stratified combustion engine exhibits significantly lower exhaust gas temperatures at lower engine speeds (e.g., less than approximately 2000–3000 RPM). This is due, in part, to the high air/fuel ratios typically used in a stratified engine at low engine speeds as shown in FIG. 17. As such, in a modified arrangement, the engine control system 74 can be arranged such that the engine 72 operates in a pre-mixed mode at least at lower engine speeds so as to increase the exhaust gas temperature and activate the catalyst 326. At higher engine speeds, the engine control system 74 can be arranged to operate in a stratified mode. As mentioned above, outboard motors are often operated for long periods of times at very low engines speeds or idle. During such periods, the exhaust temperature is usually about 100° C. Such low exhaust temperatures and can deactivate a catalyst that has been previously activated as shown in FIG. 18. This deactivation time (e.g., approximately 2–3 hours) can be predetermined through routine experimentation. As such, the ECU 144 can be configured to determine if a catalyst device is activated. For example,, the ECU 144 can determine if the engine has operated below a predetermined engine speed for a predetermined amount of time. If the engine has been operating in such a manner, steps, which will be described below, can be taken to increase the exhaust gas temperature so as to activate and/or maintain the activation of the catalyst 326. In a similar manner, the ECU 144 can be configured to measure directly or indirectly the temperature of the exhaust gas and to increase the exhaust gas temperature when the exhaust gas temperature drops below a predetermined value.

Figure 19A:
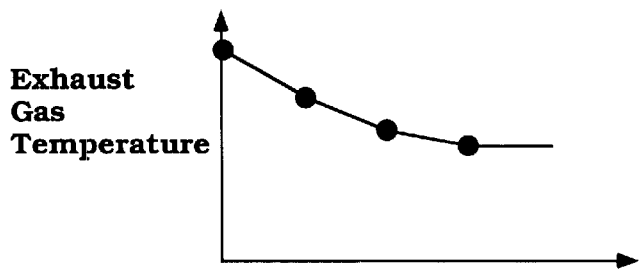
FIG. 19A is a control map illustrating exhaust gas temperature as a function of ignition timing.

FIGS. 19A–19D illustrate control maps that can be used by the ECU 144 of the control system 74 to raise the exhaust gas temperature. FIG. 19A is a control map illustrating the relationship between ignition timing and exhaust gas temperature. As shown in FIG. 19A, as ignition timing is advanced the exhaust gas temperature tends to decrease. As such, delaying ignition timing can be used to increase exhaust gas temperature.

Figure 20:
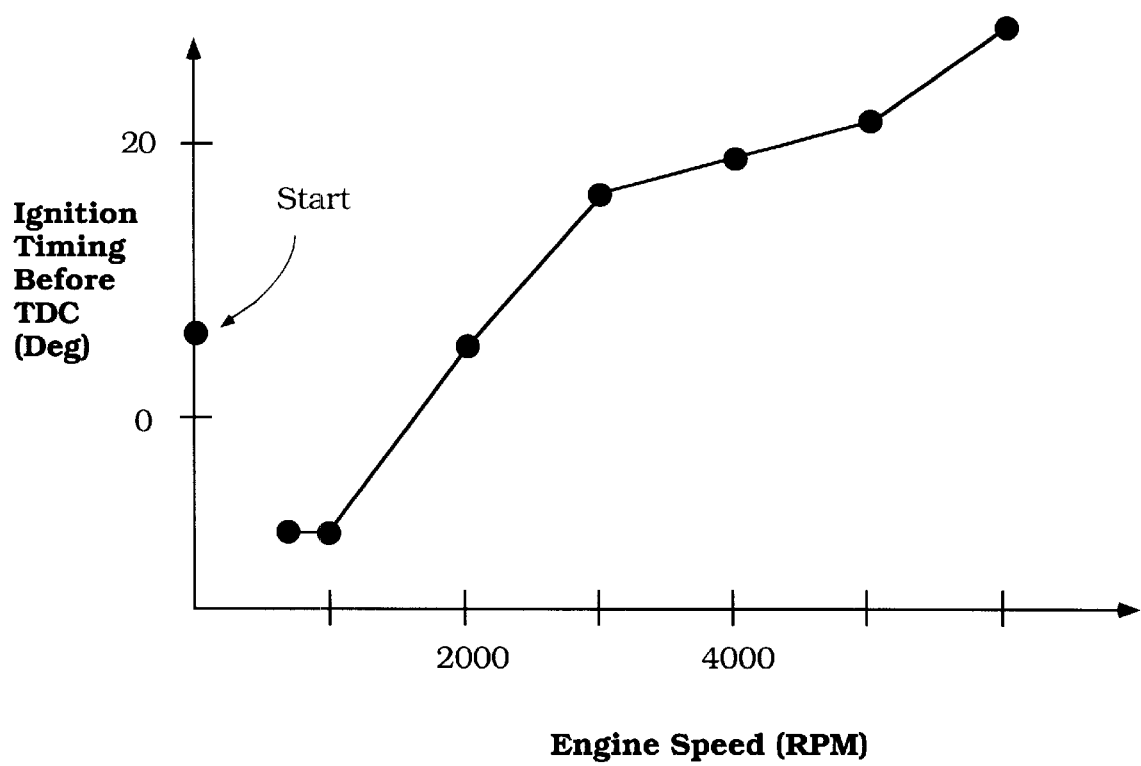
FIG. 20 is control map illustrating injection timing as a function of engine speed.

FIG. 20 illustrates how the control map of FIG. 19A can be used to control ignition timing as a function of engine speed. As shown in FIG. 20, the ignition timing is delayed for low engine speeds (e.g., approximately below 2000 RPM). As mentioned above, at low engine speeds the exhaust gas temperature is generally low. Thus, by delaying the ignition timing at low engine speeds, the exhaust gas temperature can be raised.

Figure 19B:
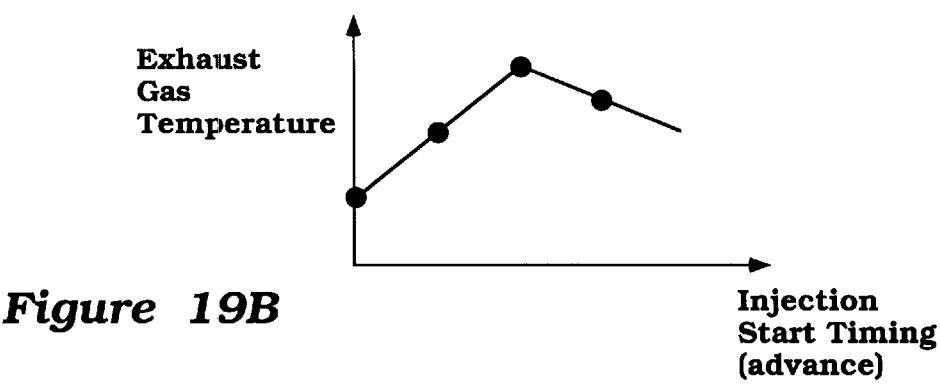
FIG. 19B is a control map illustrating exhaust gas temperature as a function of the start of fuel injection.

FIG. 19B is a control map illustrating the relationship between the start of fuel injection and exhaust gas temperature. As shown in FIG. 19B, as injection timing is advanced, the exhaust gas temperature increases until the injection timing reaches a predetermined value at which point the exhaust gas temperature decreases. As such, injection timing can also be used to increase exhaust gas temperature.

Figure 19C:
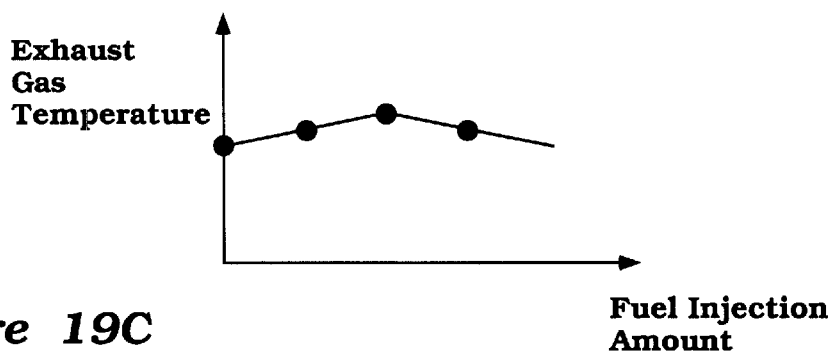
FIG. 19C is a control map illustrating exhaust gas temperature as a function of the amount of fuel injected.
Figure 21:
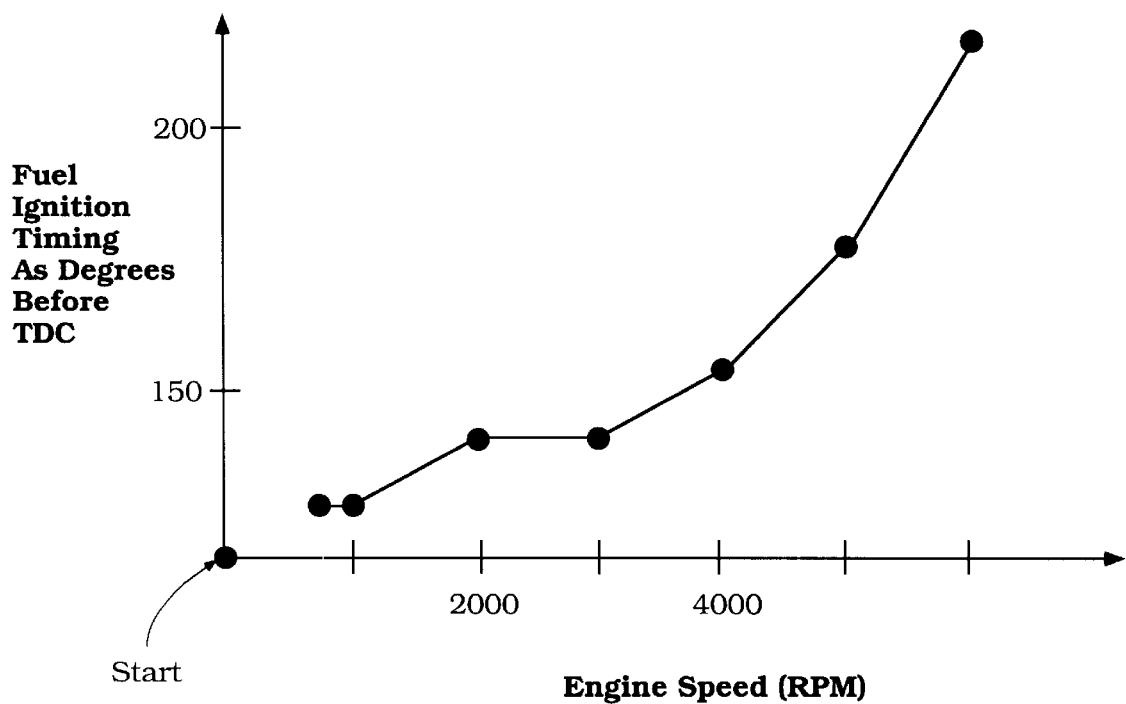
FIG. 21 is control map illustrating the start of fuel injection as a function of engine speed.

FIG. 21 illustrates how the control map of FIG. 19B can be used to control injection timing as a function of engine speed. As shown in FIG. 21, the injection timing is conducted near the predetermined value at low engine speeds and is advanced from the predetermined value at higher engine speed. FIG. 19C is a control map illustrating the relationship between the fuel injection amount and exhaust gas temperature. As shown in FIG. 19C, the fuel injection amount is increased the exhaust gas temperature increases until the fuel injection amount reaches a predetermined value. Beyond the predetermined value, the exhaust gas temperature decreases.

Figure 19D:
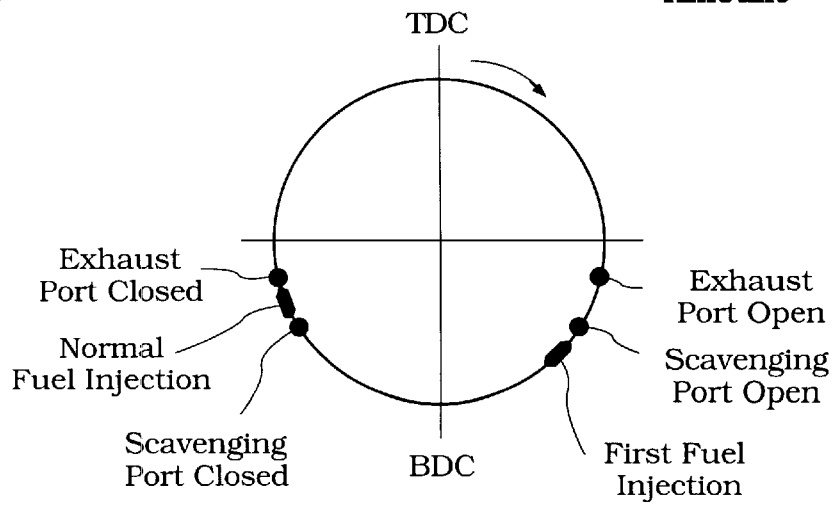
FIG. 19D is a is a timing diagram showing valve timing, fuel injection timing and ignition timing.

FIG. 19D is a timing diagram illustrating a fuel injection method that can also be used to increase exhaust gas temperatures. As shown in FIG. 19D; a first-fuel injection period is conducted immediately after the exhaust and scavenging ports opens and is preferably completed before the piston reaches bottom dead center. As such, there are two fuel injection periods. The first fuel injection increases blow by, which provides additional hydrocarbons to the catalyst. These additional hydrocarbons can be burned by the catalyst, thereby raising the temperature of the catalyst and the exhaust gases therein. Two fuel injection periods can also be use with a four-stroke engine to increase the exhaust gas temperature. In such an arrangement, the first fuel injection is executed after the exhaust port opens and is completed before the piston reaches bottom dead center and before the exhaust valve closes.

It should be appreciated that the control strategies described above can be utilized with (i) the outboard motor illustrated in FIGS. 1–7 in which the catalyst is used primarily at low engine speeds and (ii) the outboard motor illustrated in FIGS. 8 and 9 in which the catalyst is used at all engine speeds.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations and aspects of the invention have been shown and described in detail, other modifications, which are within the scope of the invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope the present invention herein disclosed should not be limited by the particular disclosed embodiments described above, but should be determined only by a fair reading of the claims that follow.

What is claimed is:

1. A four stroke internal combustion engine comprising a cylinder block that defines a cylinder bore, a cylinder head fixed at one end of the cylinder block enclosing one end of the cylinder bore, a crankcase member fixed at the other end of the cylinder block and enclosing the other end of the cylinder bore, the crankcase member defining a crankcase chamber, a piston positioned in the cylinder bore, a crankshaft rotably journaled in the crankcase and driven by the piston, the piston, the cylinder bore and the cylinder head together defining a combustion chamber, at least one intake port and intake passage for transferring an air charge to the combustion chamber, at least one exhaust port and exhaust passage for discharging exhaust gases from the combustion chamber, a spark plug having one end exposed to the combustion chamber and operatively connected to a control system, a fuel injector disposed to inject fuel directly into the combustion chamber, the fuel injector including an actuator that is operatively connected to the control system, an exhaust system connected to the exhaust passage, the exhaust system including a catalytic treatment device, the control system being configured, at least during low engine speeds, to begin injecting fuel into the combustion chamber before the intake port closes, the control system also being configured to increase a temperature of the exhaust gases if the temperature of the exhaust gases is insufficient to activate the catalytic treatment device, wherein the exhaust system comprises an exhaust manifold defining a plurality of exhaust runners communicating with the combustion chambers, a merging portion in which the exhaust runners merge, and a common exhaust passage which receives exhaust gases from the merging portion, the common exhaust passage communicating with an expansion chamber configured to quiet exhaust noises traveling through the common exhaust passage, a valve disposed in the common exhaust passage and controlling a flow of exhaust gases therethrough, a catalytic treatment passage branched from the common exhaust passage at a position upstream from the valve, the catalytic treatment passage extending from the common exhaust passage to the catalytic treatment device so as to guide exhaust gases from the common exhaust passage upstream from the valve into the catalytic device, a throttle device configured to control the flow of air into the combustion chambers, a linkage arrangement connecting the throttle device to the valve so as to control movement of the valve proportionally to a movement of the throttle device, the linkage arrangement being configured to bias the valve to a closed position when the throttle device is in a position corresponding to an idle speed of the engine.

2. The engine as set forth in claim 1, wherein the control system is configured to increase the temperature of the exhaust gases by injecting fuel into the combustion chamber in at least a first period and a second period, the first period beginning after the opening of the exhaust port and ending before the piston reaches top dead center.

3. The engine as set forth in claim 1, wherein the control system is configured to increase the temperature of the exhaust gases by delaying an ignition timing.

4. The engine as set forth in claim 1, wherein the control system is configured to increase the temperature of the exhaust gases by beginning to inject fuel into the combustion chamber closer to a predetermined time.

5. The engine as set forth in claim 1, wherein the control system is configured to increase the temperature of the exhaust gases by controlling the amount of fuel injected into the combustion chamber.

6. The engine as set forth in claim 1, wherein the control system is configured to determine if the temperature of the exhaust gases is insufficient by determining if the engine has been operating below a predetermined engine speed for a predetermined amount of time.

7. The engine as set forth in claim 1, wherein the control system is configured to determine if the temperature of the exhaust gases is insufficient by sensing the temperature of the exhaust gases and determining if the temperature of the exhaust gases are below a predetermined value.

* * * * *